US011859439B2

(12) United States Patent
Davis, II et al.

(10) Patent No.: US 11,859,439 B2
(45) Date of Patent: Jan. 2, 2024

(54) LOW THERMAL CONDUCTING SPACER ASSEMBLY FOR AN INSULATING GLAZING UNIT

(71) Applicant: Vitro Flat Glass LLC, Cheswick, PA (US)

(72) Inventors: William Davis, II, Fombell, PA (US); Bradley P. Boone, Pittsburgh, PA (US); Roxana Shabani, Gibsonia, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 146 days.

(21) Appl. No.: 17/230,564

(22) Filed: Apr. 14, 2021

(65) Prior Publication Data

US 2021/0324676 A1 Oct. 21, 2021

Related U.S. Application Data

(60) Provisional application No. 63/010,169, filed on Apr. 15, 2020.

(51) Int. Cl.

| | |
|---|---|
| ***E06B 3/66*** | (2006.01) |
| ***E06B 3/67*** | (2006.01) |
| ***E06B 3/673*** | (2006.01) |
| ***E06B 3/663*** | (2006.01) |

(52) U.S. Cl.

CPC ...... *E06B 3/67313* (2013.01); *E06B 3/66309* (2013.01); *E06B 3/66342* (2013.01); *E06B 3/66361* (2013.01); *E06B 2003/6639* (2013.01)

(58) Field of Classification Search

CPC ............ E06B 3/66309; E06B 3/66314; E06B 3/66342; E06B 3/66352; E06B 3/66361; E06B 3/67308; E06B 3/67313; E06B 3/67326; E06B 2003/6639; E06B 3/663

USPC ........................................................ 52/786.13

See application file for complete search history.

(56) References Cited

U.S. PATENT DOCUMENTS

| | | | |
|---|---|---|---|
| 3,981,111 | A | 9/1976 | Berthagen |
| 4,193,236 | A | 3/1980 | Mazzoni et al. |
| 4,379,040 | A | 4/1983 | Gillery |
| 4,464,874 | A | 8/1984 | Shea, Jr. et al. |
| 4,466,562 | A | 8/1984 | DeTorre |
| 4,671,155 | A | 6/1987 | Goldinger |
| 4,746,347 | A | 5/1988 | Sensi |
| 4,792,536 | A | 12/1988 | Pecoraro et al. |
| 4,861,669 | A | 8/1989 | Gillery |
| 4,898,789 | A | 2/1990 | Finley |
| 4,898,790 | A | 2/1990 | Finley |
| 4,900,633 | A | 2/1990 | Gillery |
| 4,920,006 | A | 4/1990 | Gillery |

(Continued)

FOREIGN PATENT DOCUMENTS

| | | | |
|---|---|---|---|
| DE | 4225757 A1 * | 2/1993 | ............ E06B 3/677 |
| EP | 0475213 A1 | 3/1992 | |

(Continued)

*Primary Examiner* — Ryan D Kwiecinski

(74) *Attorney, Agent, or Firm* — The Webb Law Firm

(57) ABSTRACT

A spacer for an insulated glazing unit (IGU) is provided herein, along with an IGU and methods of making the spacer and IGU. The spacer imparts high thermal insulation to the IGU. Also provided are methods of preparing an insulating glazing unit, as well as methods of preparing a spacer for an IGU.

20 Claims, 14 Drawing Sheets

(56) References Cited

U.S. PATENT DOCUMENTS

| | | | | | |
|---|---|---|---|---|---|
| 4,938,857 | A | | 7/1990 | Gillery | |
| 5,030,593 | A | | 7/1991 | Heithoff | |
| 5,030,594 | A | | 7/1991 | Heithoff | |
| 5,088,258 | A | | 2/1992 | Schield et al. | |
| 5,106,663 | A | | 4/1992 | Box | |
| 5,240,886 | A | | 8/1993 | Gulotta et al. | |
| 5,328,768 | A | | 7/1994 | Goodwin | |
| 5,377,473 | A | * | 1/1995 | Narayan | E06B 3/66314 52/786.13 |
| 5,385,872 | A | | 1/1995 | Gulotta et al. | |
| 5,393,593 | A | | 2/1995 | Gulotta et al. | |
| 5,439,716 | A | * | 8/1995 | Larsen | E06B 3/66314 52/786.13 |
| 5,492,750 | A | | 2/1996 | Shumaker, Jr. et al. | |
| 5,531,047 | A | | 7/1996 | Leopold et al. | |
| 5,655,282 | A | * | 8/1997 | Hodek | E06B 3/667 156/107 |
| 5,675,944 | A | | 10/1997 | Kerr et al. | |
| 5,705,010 | A | | 1/1998 | Larsen | |
| 5,813,191 | A | * | 9/1998 | Gallagher | E06B 3/66309 52/204.5 |
| 6,115,989 | A | * | 9/2000 | Boone | E06B 3/66366 52/786.13 |
| 6,131,364 | A | * | 10/2000 | Peterson | E06B 3/66323 52/786.13 |
| 6,823,644 | B1 | | 11/2004 | Peterson | |
| 8,586,193 | B2 | | 11/2013 | Rapp et al. | |
| 8,789,343 | B2 | | 7/2014 | Zurn et al. | |
| 9,127,502 | B2 | | 9/2015 | Trpkovski | |
| 9,546,513 | B2 | * | 1/2017 | Stark | E06B 3/66371 |
| 9,617,781 | B2 | | 4/2017 | Trpkovski | |
| 10,648,223 | B2 | * | 5/2020 | Graham | E06B 3/67343 |
| 2008/0053037 | A1 | * | 3/2008 | Gallagher | E06B 3/66314 52/786.13 |
| 2014/0165484 | A1 | | 6/2014 | Zurn et al. | |
| 2016/0108659 | A1 | | 4/2016 | Stark et al. | |

FOREIGN PATENT DOCUMENTS

| | | | | | |
|---|---|---|---|---|---|
| GB | 1508778 | | | 4/1978 | |
| GB | 1508778 | A | * | 4/1978 | E06B 3/66314 |
| GB | 2259732 | A | * | 3/1993 | E06B 3/677 |

* cited by examiner

| Spacer Width Nominal | Spacer Width Actual (inches) | Existing Product Coil Strip Width | New Product Single Seal Design Stirp Width ($W_{sh}$) | New Product Dual-Seal Design Strip Width ($W_{sh}$) | Percentage Coil Width Increase Single Seal Design | Percentage Coil Width Increase Dual-Seal Design | Single Seal ($W_{sp}/W_{sh}$ x 100%) | Dual-Seal ($W_{sp}/W_{sh}$ x 100%) |
|---|---|---|---|---|---|---|---|---|
| 15/32" | 0.46875 | 1.131 | 2.150 | 2.028 | 90 | 79 | 21.8 | 23.1 |
| 1/2" | 0.5 | 1.163 | 2.182 | 2.060 | 88 | 77 | 22.9 | 24.3 |
| 17/32" | 0.53125 | 1.193 | 2.212 | 2.090 | 85 | 75 | 24.0 | 25.4 |
| 9/16" | 0.5625 | 1.225 | 2.244 | 2.122 | 83 | 73 | 25.1 | 26.5 |
| 19/32" | 0.59375 | 1.257 | 2.276 | 2.154 | 81 | 71 | 26.1 | 27.6 |
| 5/8" | 0.625 | 1.288 | 2.307 | 2.185 | 79 | 70 | 27.1 | 28.6 |
| 21/32" | 0.65625 | 1.319 | 2.338 | 2.216 | 77 | 68 | 28.1 | 29.6 |
| 11/16" | 0.6875 | 1.351 | 2.370 | 2.248 | 75 | 66 | 29.0 | 30.6 |
| 23/32" | 0.71875 | 1.383 | 2.402 | 2.280 | 74 | 65 | 29.9 | 31.5 |
| 3/4" | 0.75 | 1.413 | 2.432 | 2.310 | 72 | 63 | 30.8 | 32.5 |
| 25/32" | 0.78125 | 1.445 | 2.464 | 2.342 | 70 | 62 | 31.7 | 33.4 |
| 13/16" | 0.8125 | 1.476 | 2.495 | 2.373 | 69 | 61 | 32.6 | 34.2 |
| 27/32" | 0.84375 | 1.507 | 2.526 | 2.404 | 68 | 59 | 33.4 | 35.1 |
| 7/8" | 0.875 | 1.538 | 2.557 | 2.435 | 66 | 58 | 34.2 | 35.9 |

FIG. 17

LOW THERMAL CONDUCTING SPACER ASSEMBLY FOR AN INSULATING GLAZING UNIT

CROSS-REFERENCE TO RELATED APPLICATION

This application claims the benefit of U.S. Provisional Application No. 63/010,169, filed Apr. 15, 2020, which is incorporated herein by reference in its entirety.

BACKGROUND OF THE INVENTION

Field of the Invention

Insulated glazing units, spacers for insulated glazing units, and methods of making insulated glazing units are provided herein.

Description of Related Art

Conventional architectural window glass is highly thermally emissive. Solar energy easily passes through such glass. In order to reduce the passage of solar energy, low emissivity coatings are applied onto the glass. Low emissivity coatings act as thermal barriers that decrease the emission of radiant infrared (IR) energy, particularly thermal infrared energy. The lower the emissivity, the better the coating is in blocking the emission of thermal IR energy.

Heat transfer of an insulating glazing unit (IGU) may be controlled by a variety of factors, including the design of the spacer frame between panels (lites, panes, etc.) in an IGU and the structure and composition of the panels. Numerous IGU and IGU spacer structures are described, such as those of U.S. Pat. Nos. 3,981,111, 5,377,473, 5,705,010, 6,823,644, 8,586,193, 8,789,343, 9,127,502, 9,546,513, and 9,617,781, exhibiting great variation in heat transfer resistance, complexity, and complexity of manufacturing.

Heat transfer in IGUs may be measured in a number of ways. The overall heat transfer coefficient (U factor) is a measure of heat loss through the window. The lower the U factor, the lower the heat transfer through the window, i.e. the higher the insulating level of the window. The U factor is specific to a particular IGU. Resistance or Res-value (e.g., hr·° F.·in/BTU) is a measurement of edge resistance or heat loss through a unit length of an edge portion of an IGU, e.g., determined by the spacer composition and structure, and is independent of the overall size of the IGU.

Edge assemblies and IGUs often require multiple manufacturing steps and human intervention. As such, an IGU and a spacer or spacer frame for an IGU that has superior heat transfer profile, e.g., Res-value, and which can be simply manufactured with minimal human intervention is most desirable.

SUMMARY OF THE INVENTION

In one aspect of the invention, an insulating glazing unit is provided. The insulating glazing unit comprises: a first panel and a second panel, the first panel having a first major surface (surface 1) and an opposite second major surface (surface 2) and marginal edges, the second panel having a first major surface (surface 3) and an opposite second major surface (surface 4) and marginal edges; a metal spacer formed from a single metal sheet, having an internal side and an opposite external side, affixed with adhesive to marginal portions of surface 2 of the first panel and surface 3 of the second panel and supporting the first and second panel in a spaced-apart configuration, with the internal side of the spacer, surface 2 of the first panel, and surface 3 of the second panel defining a sealed compartment, the spacer comprising: a first wall on a first lateral side of the spacer adjacent to surface 2 of the first panel, having a major planar portion and comprising a first lip extending from an inward side of the first wall toward surface 3 of the second panel; a second wall on a second lateral side of the spacer opposite the first wall and adjacent to surface 3 of the second panel, having a major planar portion and comprising a second lip extending from an inward side of the second wall toward surface 2 of the first panel, wherein the first and second lips define a gap opening into the compartment, and a central portion extending from a marginal side of the first wall opposite the first lip to a marginal side of the second wall opposite the second lip, comprising two or more longitudinal ridges with a first lateral valley portion between and connecting the first wall and an adjacent ridge and defining a first lateral valley on the internal side of the spacer, a second lateral valley portion between and connecting the second wall and an adjacent ridge and defining a second lateral valley on the internal side of the spacer, and one or more central valley portions between and connecting longitudinal ridges and defining one or more central valleys on the internal side of the spacer, each ridge comprising a plurality of walls comprising parallel portions parallel to each other, with peak portions connecting adjacent walls; and desiccant disposed in a central valley.

In another aspect, a spacer for an insulated glazing unit is provided. The spacer comprises a single metal sheet formed into a structure comprising: an elongate corrugated portion comprising two or more longitudinal ridges; a first elongate lateral wall, having a major planar portion and extending from a first major edge of the corrugated portion; a second lateral elongate wall, having a major planar portion and extending from a second major edge of the corrugated portion in the same direction as the first elongate wall; a first lip extending from the first elongate lateral wall opposite the corrugated portion and extending towards the second elongate lateral wall; and a second lip extending from the second elongate lateral wall opposite the corrugated portion and extending towards the first elongate lateral wall and defining a gap between the first lip and the second lip; the corrugated portion comprising two or more longitudinal ridges, with a first lateral valley portion between and connecting the first elongate lateral wall and an adjacent ridge and defining a first lateral valley, a second lateral valley portion between and connecting the second elongate lateral wall and an adjacent ridge and defining a second lateral valley, and one or more central valley portions between and connecting adjacent longitudinal ridges and defining one or more central valleys, each ridge comprising a plurality of walls, with peak portions connecting adjacent walls.

In another aspect, a spacer is provided for use in an insulated glazing unit. The spacer is formed from a single sheet of stainless steel or tin-plated steel, and comprises lateral walls connected by a central portion comprising from two to four longitudinal ridges, wherein the width of the spacer is no more than 35% the linear width of the metal folded to form the spacer, and wherein, when assembled in an insulating glazing unit, has a Res-value ((in-hr-° F.)/BTU) of at least 190, 195, 200, 205, 210, or 215, optionally, as defined by the inverse of the flow of the (BTU/hr·° F.·in.) that occurs from the interface of the glass and adhesive layer at the inside side of the unit to the interface of the glass and adhesive layer of the outside of the unit per unit increment of temperature (1° F.), per unit length of edge assembly perimeter (inch), and wherein the glass/adhesive interfaces are assumed to be isothermal. Also provided is an insulated glazing unit comprising a first panel and a second panel, the first panel having a first major surface (surface 1) and an opposite second major surface (surface 2) and marginal edges, the second panel having a first major surface (surface 3) and an opposite second major surface (surface 4) and marginal edges; and the spacer, having an internal side and an opposite external side, affixed with adhesive to marginal portions of surface 2 of the first panel and surface 3 of the second panel and supporting the first and second panel in a spaced-apart configuration, with the internal side of the spacer, surface 2 of the first panel, and surface 3 of the second panel defining a sealed compartment.

In a further aspect, a method of preparing an insulating glazing unit is provided. The method comprises affixing a spacer as described in the previous paragraphs between a first glazing panel and a second glazing panel with the spacer affixed with a adhesive to marginal portions of a major surface of the first panel and the second panel, holding the first and second panels in a spaced-apart configuration, thereby defining a compartment.

In yet another aspect, a method of preparing a spacer for an insulated glazing unit is provided. The method comprises roll-forming a metal sheet into an elongate unit comprising: an elongate corrugated portion comprising two or more longitudinal ridges; a first elongate lateral wall, having a major planar portion and extending from a first major edge of the corrugated portion; a second lateral elongate wall, having a major planar portion and extending from a second major edge of the corrugated portion in the same direction as the first elongate wall; a first lip extending from the first elongate lateral wall opposite the corrugated portion and extending towards the second elongate lateral wall; and a second lip extending from the second elongate lateral wall opposite the corrugated portion and extending towards the first elongate lateral wall and defining a gap between the first lip and the second lip; the corrugated portion comprising two or more longitudinal ridges, with a first lateral valley portion between and connecting the first elongate lateral wall and an adjacent ridge and defining a first lateral valley, a second lateral valley portion between and connecting the second elongate lateral wall and an adjacent ridge and defining a second lateral valley, and one or more central valley portions between and connecting adjacent longitudinal ridges and defining one or more central valleys, each ridge comprising a plurality of walls, with peak portions connecting adjacent walls.

The present invention is also directed to the following clauses.

Clause 1: An insulating glazing unit comprising:

a first panel and a second panel, the first panel having a first major surface (surface 1) and an opposite second major surface (surface 2) and marginal edges, the second panel having a first major surface (surface 3) and an opposite second major surface (surface 4) and marginal edges; a metal spacer formed from a single metal sheet, having an internal side and an opposite external side, affixed with adhesive to marginal portions of surface 2 of the first panel and surface 3 of the second panel and supporting the first and second panel in a spaced-apart configuration, with the internal side of the spacer, surface 2 of the first panel, and surface 3 of the second panel defining a sealed compartment, wherein the metal spacer comprises:

a first wall on a first lateral side of the metal spacer adjacent to surface 2 of the first panel, having a major planar portion and comprising a first lip extending from an inward side of the first wall toward surface 3 of the second panel;

a second wall on a second lateral side of the spacer opposite the first wall and adjacent to surface 3 of the second panel, having a major planar portion and comprising a second lip extending from an inward side of the second wall toward surface 2 of the first panel, wherein the first and second lips define a gap opening into the compartment, and a central portion extending from a marginal side of the first wall opposite the first lip to a marginal side of the second wall opposite the second lip, comprising two or more longitudinal ridges with a first lateral valley portion between and connecting the first wall and an adjacent ridge and defining a first lateral valley on the internal side of the spacer, a second lateral valley portion between and connecting the second wall and an adjacent ridge and defining a second lateral valley on the internal side of the spacer, and one or more central valley portions between and connecting longitudinal ridges and defining one or more central valleys on the internal side of the spacer, each ridge comprising a plurality of walls comprising parallel portions parallel to each other, with peak portions connecting adjacent walls; and desiccant disposed in a central valley.

Clause 2: The insulating glazing unit of clause 1, wherein the first and second lateral valleys are free of desiccant.

Clause 3: The insulating glazing unit of clause 1 or 2, wherein the first wall is substantially parallel to the first panel and the second wall is parallel to or substantially parallel to the second panel.

Clause 4: The insulating glazing unit of any one of clauses 1-3, wherein the height of the ridges ranges from 50% to 80% of the height of the spacer.

Clause 5: The insulating glazing unit of any one of clauses 1-4, wherein the planar portions of the walls of the ridges are parallel to the planar portion of the first wall, the second wall, or both the first and second walls.

Clause 6: The insulating glazing unit of any one of clauses 1-5, wherein one or more of the peak portions and/or one or more of the valley portions comprises a flat portion perpendicular to, or substantially perpendicular to the walls of the ridges.

Clause 7: The insulating glazing unit of any one of clauses 1-6, further comprising a lateral fold extending from the first wall to the first lateral valley and/or from the second wall to the second lateral valley at an angle of less than 90° from a plane of the planar portion of the first and/or second wall.

Clause 8: The insulating glazing unit of clause 7, wherein the angle of the lateral fold or folds ranges from 5° to 85°, from 30° to 60°, e.g., 30°, 40°, 45°, 50°, or 60°, from a plane of the planar portion of first and/or second wall.

Clause 9: The insulating glazing unit of any one of clauses 1-8, wherein the adhesive between surface 2 of the first panel and the first wall adjacent to the first panel covers at least a portion of the external side of the first lateral valley portion, and the adhesive between surface 3 of the second panel and the second wall adjacent to the second panel covers at least a portion of the external side of the second lateral valley portion, and wherein a remainder of the external side of the spacer is in contact with a gas or an insulating material.

Clause 10: The insulating glazing unit of any one of clauses 1-9, wherein the first panel and the second panel are transparent.

Clause 11: The insulating glazing unit of any one of clauses 1-10, wherein one or both of the first panel and the second panel comprise low-emissivity glass.

Clause 12: The insulating glazing unit of any one of clauses 1-11, wherein the spacer has a Res-value ((in-hr-° F.)/BTU) of at least 190, 195, 200, 205, 210, or 215, optionally, as defined by the inverse of the flow of the (BTU/hr·° F.·in.) that occurs from the interface of the glass and adhesive layer at the inside side of the unit to the interface of the glass and adhesive layer of the outside of the unit per unit increment of temperature (1° F.), per unit length of edge assembly perimeter (inch), and wherein the glass/adhesive interfaces are assumed to be isothermal.

Clause 13: The insulating glass unit of any one of clauses 1-12, wherein the spacer comprises stainless steel or tin-plated steel.

Clause 14: The insulating glazing unit of any one of clauses 1-13, wherein the width of the spacer is no more than 35% the linear width of the metal folded to form the spacer.

Clause 15: The insulating glazing unit of any one of clauses 1-14, wherein the spacer comprises three longitudinal ridges.

Clause 16: The insulating glazing unit of any one of clauses 1-15, wherein the spacer forms a contiguous frame surrounding, and forming an airtight seal about the compartment.

Clause 17: The insulating glazing unit of clause 16, wherein the compartment is filled with an inert gas, such as argon.

Clause 18: The insulating glazing unit of any one of clauses 1-17, wherein the adhesive further extends between the first and second panels below the valley portions and into a space formed between the adjacent walls and the connecting peak portions of the ridges.

Clause 19: The insulating glazing unit of any one of clauses 1-17, wherein a barrier member extends across the valley portions of the spacer and adhesive further extends between the first and second panels below the valley portions and barrier member such that adhesive does not enter into a space formed between the adjacent walls and the connecting peak portions of the ridges.

Clause 20: The insulating glazing unit of any one of clauses 1-19, wherein the adhesive comprises a polyisobutylene portion and a silicone portion.

Clause 21: A spacer for an insulated glazing unit, comprising a single metal sheet formed into a structure comprising:

- an elongate corrugated portion comprising two or more longitudinal ridges;
- a first elongate lateral wall, having a major planar portion and extending from a first major edge of the corrugated portion;
- a second lateral elongate wall, having a major planar portion and extending from a second major edge of the corrugated portion in the same direction as the first elongate wall;
- a first lip extending from the first elongate lateral wall opposite the corrugated portion and extending towards the second elongate lateral wall; and
- a second lip extending from the second elongate lateral wall opposite the corrugated portion and extending towards the first elongate lateral wall and defining a gap between the first lip and the second lip;
- the corrugated portion comprising two or more longitudinal ridges, with a first lateral valley portion between and connecting the first elongate lateral wall and an adjacent ridge and defining a first lateral valley, a second lateral valley portion between and connecting the second elongate lateral wall and an adjacent ridge and defining a second lateral valley, and one or more central valley portions between and connecting adjacent longitudinal ridges and defining one or more central valleys, each ridge comprising a plurality of walls, with peak portions connecting adjacent walls.

Clause 22: The spacer of clause 21, wherein a major planar portion of the first elongate lateral wall is parallel to a major planar portion of the second elongate lateral wall.

Clause 23: The spacer of clause 21 or 22, wherein the longitudinal ridges extend from 50% to 80% of the height of the spacer.

Clause 24: The spacer of any one of clauses 21-23, wherein the plurality of walls of the ridges are substantially parallel to the first elongate lateral wall and/or the second elongate lateral wall.

Clause 25: The spacer of any one of clauses 21-24, wherein one or more of the peaks and/or one or more of the valleys comprises a flat portion substantially perpendicular to the walls of the ridges.

Clause 26: The spacer of any one of clauses 21-25, further comprising a lateral fold extending from the first wall to the first lateral valley and/or from the second wall to the second lateral valley at an angle of less than 90° from the plane of major planar portions of the first and/or second elongate lateral wall.

Clause 27: The spacer of clause 26, wherein the angle of the lateral fold or folds ranges from 5° to 85°, from 30° to 60°, e.g., 30°, 40°, 45°, 50°, or 60°, from the plane of major planar portions of the first and/or second elongate lateral wall.

Clause 28: The spacer of any one of clauses 21-27, wherein, when assembled in an insulating glazing unit, has a Res-value ((in-hr-° F.)/BTU) of at least 190, 195, 200, 205, 210, or 215, optionally, as defined by the inverse of the flow of the (BTU/hr·° F.·in.) that occurs from the interface of the glass and adhesive layer at the inside side of the unit to the interface of the glass and adhesive layer of the outside of the unit per unit increment of temperature (1° F.), per unit length of edge assembly perimeter (inch), and wherein the glass/adhesive interfaces are assumed to be isothermal.

Clause 29: The spacer of any one of clauses 21-28, comprising stainless steel or tin-plated steel.

Clause 30: The spacer of any one of clauses 21-29, wherein the spacer comprises three longitudinal ridges.

Clause 31: The spacer of any one of clauses 21-30, comprising desiccant disposed in a central valley, wherein the first and second lateral valleys are free of desiccant.

Clause 32: The spacer of any one of clauses 21-31, wherein the width of the spacer is no more than 35% the linear width of the metal folded to form the spacer.

Clause 33: The spacer of any one of clauses 21-32, wherein the adhesive further extends between the first and second panels below the valley portions and into a space formed between the adjacent walls and the connecting peak portions of the ridges.

Clause 34: The spacer of any one of clauses 21-32, wherein a barrier member extends across the valley portions of the spacer and adhesive further extends between the first and second panels below the valley portions and barrier member such that adhesive does not enter into a space formed between the adjacent walls and the connecting peak portions of the ridges.

Clause 35: A method of preparing an insulating glazing unit, comprising affixing a spacer according to any one of clauses 21-34 between a first glazing panel and a second glazing panel with the spacer affixed with a adhesive to marginal portions of a major surface of the first panel and the second panel, holding the first and second panels in a spaced-apart configuration, thereby defining a compartment.

Clause 36: The method of clause 35, wherein the compartment is air-tight.

Clause 37: The method of clause 36, wherein the compartment is filled with an inert gas or a mixture of air and an inert gas.

Clause 38: The method of clause 37, wherein the compartment is filled with at least 90% argon.

Clause 39: The method of any one of clauses 37-38, further comprising depositing a desiccant to one or more of the central valleys within the compartment, and leaving the lateral valleys of the compartment free of desiccant.

Clause 40: The method of any one of clauses 35-39, wherein the first panel and the second panel are transparent.

Clause 41: The method of any one of clauses 35-40, wherein one or both of the first panel and the second panel comprises low-emissivity glass.

Clause 42: The method of any one of clauses 35-41, further comprising nicking at least the first and second lips of the spacer and optionally a portion of the first and second wall adjacent to the lips, at a bending location on the spacer, and bending the spacer towards the nicks at the bending location.

Clause 43: The method of any one of clauses 35-42, comprising, in order, applying adhesive to the spacer, bending the spacer to align with marginal portions of the panels, and affixing the spacer between the first glazing panel and the second glazing panel.

Clause 44: The method of any one of clauses 35-43, wherein the adhesive comprises a polyisobutylene portion and a silicone portion.

Clause 45: A method of preparing a spacer for an insulated glazing unit, comprising roll-forming a metal sheet into an elongate unit comprising:

- an elongate corrugated portion comprising two or more longitudinal ridges;
- a first elongate lateral wall, having a major planar portion and extending from a first major edge of the corrugated portion;
- a second lateral elongate wall, having a major planar portion and extending from a second major edge of the corrugated portion in the same direction as the first elongate wall;
- a first lip extending from the first elongate lateral wall opposite the corrugated portion and extending towards the second elongate lateral wall; and
- a second lip extending from the second elongate lateral wall opposite the corrugated portion and extending towards the first elongate lateral wall and defining a gap between the first lip and the second lip;
- the corrugated portion comprising two or more longitudinal ridges, with a first lateral valley portion between and connecting the first elongate lateral wall and an adjacent ridge and defining a first lateral valley, a second lateral valley portion between and connecting the second elongate lateral wall and an adjacent ridge and defining a second lateral valley, and one or more central valley portions between and connecting adjacent longitudinal ridges and defining one or more central valleys, each ridge comprising a plurality of walls, with peak portions connecting adjacent walls.

Clause 46: The method of clause 45, further comprising forming corner clearances in the metal sheet or roll-formed spacer at corner locations in the metal sheet or spacer.

Clause 47: The method of clause 45 or 46, further comprising forming swaged ends in the metal sheet or roll-formed spacer.

Clause 48: The method of any one of clauses 45-47, further comprising cutting the spacer into a single frame length after roll-forming the spacer.

Clause 49: The method of any one of clauses 45-48, further comprising applying one or more adhesives to the exterior side of the longitudinal walls.

Clause 50: The method of any one of clauses 45-49, further comprising applying a desiccant matrix to a central valley of the interior side of the formed spacer with no desiccant matrix applied to corner locations of the spacer.

Clause 51: The method of clause 50, further comprising bending the spacer into a spacer frame using one or more internal dies.

Clause 52: The method of any one of clauses 45-51, wherein, when assembled in an insulating glazing unit, the spacer has a Res-value ((in-hr-° F.)/BTU) of at least 190, 195, 200, 205, 210, or 215, optionally, as defined by the inverse of the flow of the (BTU/hr·° F.·in.) that occurs from the interface of the glass and adhesive layer at the inside side of the unit to the interface of the glass and adhesive layer of the outside of the unit per unit increment of temperature (1° F.), per unit length of edge assembly perimeter (inch), and wherein the glass/adhesive interfaces are assumed to be isothermal.

Clause 53: The method of any one of clauses 45-52, performed as continuous, automated process in a single manufacturing line.

Clause 54: A spacer for use in an insulated glazing unit formed from a single sheet of stainless steel or tin-plated steel, comprising lateral walls connected by a central portion comprising from two to four longitudinal ridges, wherein the width of the spacer is no more than 35% the linear width of the metal folded to form the spacer, and wherein, when assembled in an insulating glazing unit, has a Res-value ((in-hr-° F.)/BTU) of at least 190, 195, 200, 205, 210, or 215, optionally, as defined by the inverse of the flow of the (BTU/hr·° F.·in.) that occurs from the interface of the glass and adhesive layer at the inside side of the unit to the interface of the glass and adhesive layer of the outside of the unit per unit increment of temperature (1° F.), per unit length of edge assembly perimeter (inch), and wherein the glass/adhesive interfaces are assumed to be isothermal.

Clause 55: An insulated glazing unit comprising a first panel and a second panel, the first panel having a first major surface (surface 1) and an opposite second major surface (surface 2) and marginal edges, the second panel having a first major surface (surface 3) and an opposite second major surface (surface 4) and marginal edges; and the spacer of clause 54, having an internal side and an opposite external side, affixed with adhesive to marginal portions of surface 2 of the first panel and surface 3 of the second panel and supporting the first and second panel in a spaced-apart configuration, with the internal side of the spacer, surface 2 of the first panel, and surface 3 of the second panel defining a sealed compartment.

BRIEF DESCRIPTION OF THE DRAWINGS

FIG. 9B is a cross section of the die of FIG. 9A at B and rotated 90° at A.

FIG. 10B is a cross section of the die of FIG. 10A at A and rotated 90° at B.

FIG. 17 is a table providing dimensions of exemplary spacers as described in Example 5.

DESCRIPTION OF THE INVENTION

Figure 1A:
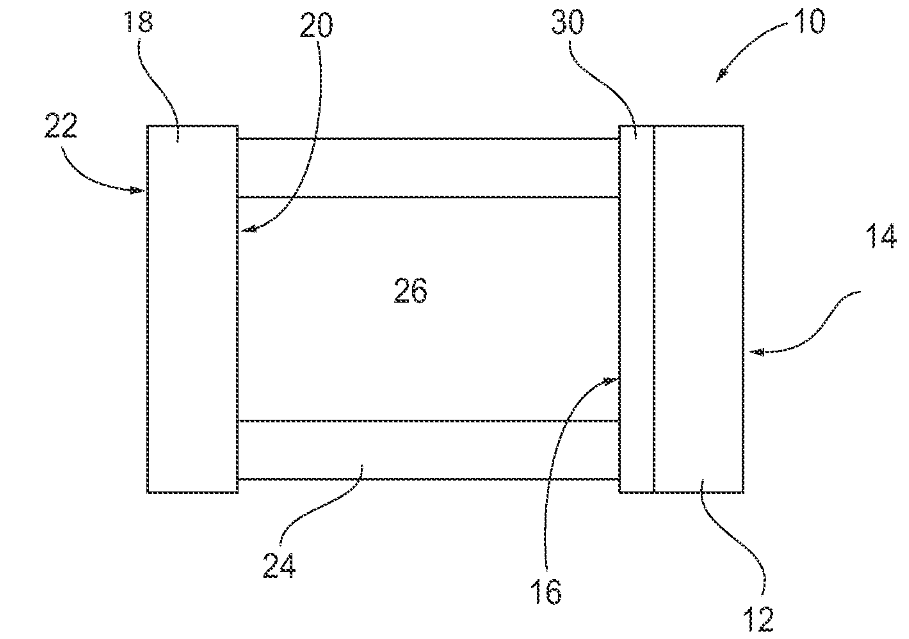
FIGS. 1A and 1B depict schematically overall structure of exemplary insulating glazing units (IGUs).

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. The drawings are not necessarily to scale. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. "A" or "an" refers to one or more.

The articles described herein typically, but not exclusively, find use in architecture. The articles may be discussed with reference to their use in an insulating glass unit (IGU). In an IGU, a spacer described herein may be used to space apart two panels, such as panels used in architectural transparencies. As used herein, the term "architectural transparency" refers to any transparency located on a building, such as, but not limited to, windows and sky lights. However, it is to be understood that the articles described herein are not limited to use with such architectural transparencies but may be practiced with transparencies in any desired field, such as, but not limited to, laminated or non-laminated residential and/or commercial windows, insulating glass units, and/or transparencies for land, air, space, above water, and underwater vehicles. In one aspect or embodiment, the coated articles as described herein are transparencies for use in a vehicle, such as a window or a sunroof. Therefore, it is to be understood that the specifically disclosed exemplary aspects or embodiments are presented simply to explain the general concepts of the invention, and that the invention is not limited to these specific exemplary embodiments. Additionally, while a typical "transparency" can have sufficient visible light transmission such that materials can be viewed through the transparency, the "transparency" need not be transparent to visible light but may be translucent or opaque. That is, by "transparent" is meant having visible light transmission of greater than 0% up to 100%.

A non-limiting transparency 10 is illustrated in FIG. 1A. The transparency 10 may have any desired visible light, infrared radiation, or ultraviolet radiation transmission, transmittance, absorption, and/or reflection profile. The transparency 10 of FIG. 1A is in the form of a conventional insulating glass unit and includes a first panel 12 or ply with a first major surface 14 (No. 1 surface) and an opposed second major surface 16 (No. 2 surface). In common usage, when installed into a building, the first major surface 14 faces the building exterior, e.g., is an outer major surface, and the second major surface 16 faces the interior of the building. The transparency 10 also includes a second panel 18 or ply having an inner (first) major surface 20 (No. 3 surface) and an outer (second) major surface 22 (No. 4 surface) and spaced from the first ply 12. This numbering of the panel or ply surfaces is in keeping with conventional practice in the fenestration art. In the context of the articles provided herein, the first and second panels 12, 18 are connected using a spacer frame 24 ("spacer") as described herein. A gap or chamber 26 is formed between the two panels 12, 18. The chamber 26 may be filled with a selected atmosphere, such as air, or a non-reactive gas such as argon or krypton gas. A solar control coating 30 (or any of the other coatings described below) may be formed over at least a portion of one of the plies 12, 18, such as, but not limited to, over at least a portion of the No. 2 surface 16 or at least a portion of the No. 3 surface 20. Although, the coating could also be on the No. 1 surface or the No. 4 surface, if desired.

Panels 12, 18 may be the same or different. Non-limiting examples of insulating glass units are found, for example, in U.S. Pat. Nos. 4,193,236; 4,464,874; 5,088,258; and 5,106,663.

Figure 1B:
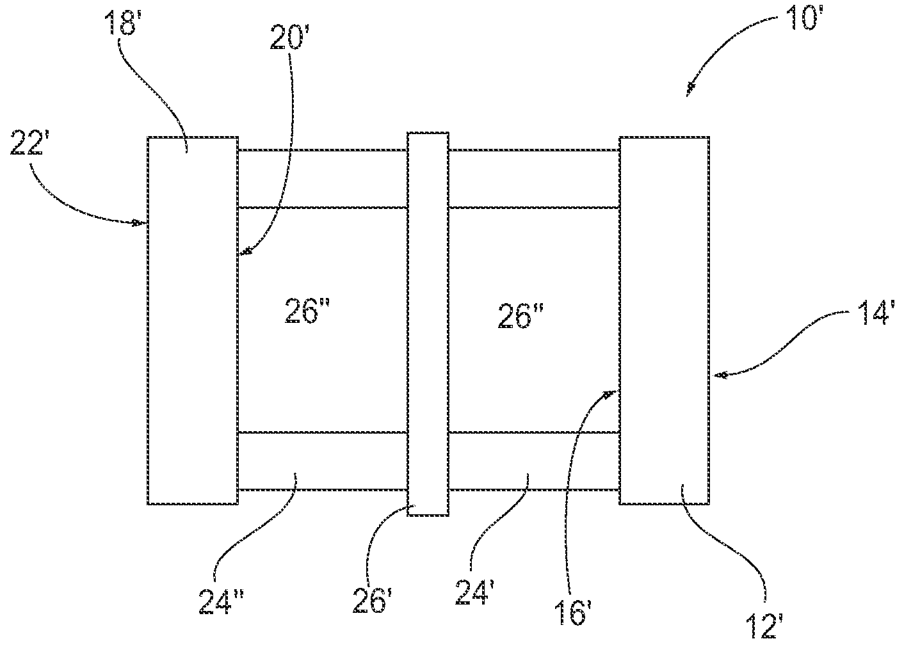

FIG. 1B depicts transparency 10', which is a variation of the transparency 10 depicted in FIG. 1A. The transparency 10' of FIG. 1B is in the form of a conventional insulating glass unit and includes a first panel 12' or ply with a first major surface 14' (No. 1 surface) and an opposed second major surface 16' (No. 2 surface). In common usage, when installed into a building, the first major surface 14' faces the building exterior, e.g., is an outer major surface, and the second major surface 16' faces the interior of the building. The transparency 10' also includes a second panel 18' or ply having an inner (first) major surface 20' (No. 3 surface) and an outer (second) major surface 22' (No. 4 surface) and spaced from the first ply 12'. A third panel 26' is disposed between the first panel 12' and the second panel 18'. The first and third panels 12', 26' are connected using a spacer frame 24' ("spacer") as described herein. The second and third panels 18', 26' are connected using a spacer frame 24" ("spacer") as described herein. Gaps or chambers 26" are formed between the panels 12', 26' and between panels 18', 26', respectively. The chambers 26" may be filled with a selected atmosphere, such as air, or a non-reactive gas such as argon or krypton gas. Panels 12', 18' and 26' may be the same or different.

As indicated above, in the broad practice of the invention, the panels 12, 18, 12', 18', 26' of the transparency 10, 10' can be of the same or different materials and may have the same or different dimensions. The panels 12, 18, 12', 18', 26' may include any desired material having any desired characteristics. For example, one or more of the panels 12, 18, 12', 18', 26' may be transparent or translucent to visible light. By "transparent" is meant having visible light transmission of greater than 0% up to 100%. Alternatively, one or more of the panels 12, 18, 12', 18', 26', may be translucent. By "translucent" is meant allowing electromagnetic energy (e.g., visible light) to pass through but diffusing that energy such that objects on the side opposite the viewer are not clearly visible. Examples of suitable materials for the panels include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the panels 12, 18, 12', 18', 26' may include conventional soda-lime-silicate glass, borosilicate glass, or leaded glass. The glass may be clear glass. By "clear glass" is meant non-tinted or non-colored glass. Alternatively, the glass may be tinted or otherwise colored glass. The glass may be annealed or heat-treated glass. As used herein, the term "heat treated" means tempered or at least partially tempered. The glass may be of any type, such as conventional float glass, and may be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. Examples of float glass processes are disclosed in U.S. Pat. Nos. 4,466,562 and 4,671,155.

The panels 12, 18, 12', 18', 26' may each comprise, for example, clear float glass or may be tinted or colored glass or one panel 12, 18, 12', 18', 26' may be clear glass and the other panel(s) 12, 18, 12', 18', 26', colored glass. Although not limiting, examples of glass suitable for the panels 12, 18, 12', 18', 26' are described in U.S. Pat. Nos. 4,746,347; 4,792,536; 5,030,593; 5,030,594; 5,240,886; 5,385,872; and 5,393,593. The panels 12, 18, 12', 18', 26' may be of any desired dimensions, e.g., length, width, shape, or thickness. In one exemplary automotive transparency, the first and second plies may each be 1 mm to 10 mm thick, such as 1 mm to 8 mm thick, such as 2 mm to 8 mm, such as 3 mm to 7 mm, such as 5 mm to 7 mm, such as 6 mm thick. Non-limiting examples of glass that may be used for the panels include clear glass, Starphire®, Solargreen®, Solextra®, GL-20®, GL-35™, Solarbronze®, Solargray® glass, Pacifica® glass, SolarBlue® glass, and Optiblue® glass.

The solar control coating 30 of the invention is deposited over at least a portion of at least one major surface of one of the panels 12, 18, 12', 18', 26'. In the example according to FIG. 1A, the coating 30 is formed over at least a portion of the inner surface 16 of the outboard glass ply 12; additionally or alternatively, it is to be understood that in non-limiting examples consistent with the present disclosure a coating may be formed over at least a portion of the inner surface 20 of the inboard glass panel 18. As used herein, the term "solar control coating" refers to a coating comprised of one or more layers or films that affect the solar properties of the coated article, such as, but not limited to, the amount of solar radiation, for example, visible, infrared, or ultraviolet radiation, reflected from, absorbed by, or passing through the coated article; shading coefficient; emissivity, etc. The solar control coating 30 may block, absorb, or filter selected portions of the solar spectrum, such as, but not limited to, the IR, UV, and/or visible spectrums.

Coatings may be deposited by any useful method, such as, but not limited to, conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30 is deposited by MSVD. Examples of MSVD coating devices and methods will be well understood by one of ordinary skill in the art and are described, for example and without limitation, in U.S. Pat. Nos. 4,379,040; 4,861,669; 4,898,789; 4,898,790; 4,900,633; 4,920,006; 4,938,857; 5,328,768; and 5,492,750.

Figure 2:
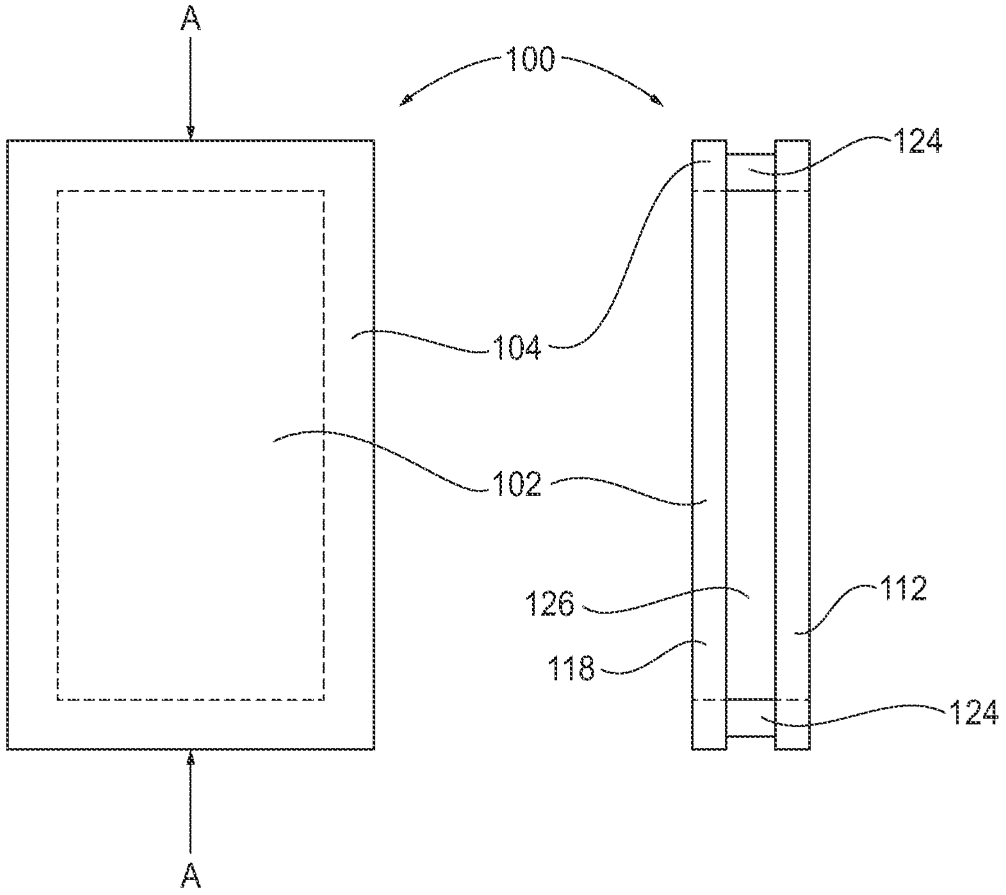
FIG. 2 provides a schematic elevation view (left) and a cross-section (right), at A of the elevation view, of an IGU as described herein.

FIG. 2 is an elevation view (left) and a cross-sectional view (right) of an insulating glazing unit (IGU) 100, with a central area 102 and a peripheral area 104, defined by the dotted line. In the cross-sectional view, panels 112, 118 and compartment 124 are depicted.

Peripheral area may comprise an area extending any suitable distance, such as, without limitation from 1" to 24", including any increment therebetween, such as 1", 2", 3", 4", 5", 6", 7", 8", 9", 10", 11", or 12", from an edge of the panel, and may depend on the dimensions of the IGU. The peripheral area may be peripheral to, that is, in a direction toward the edges of the IGU, the sight line of the IGU 100.

Figure 3A:
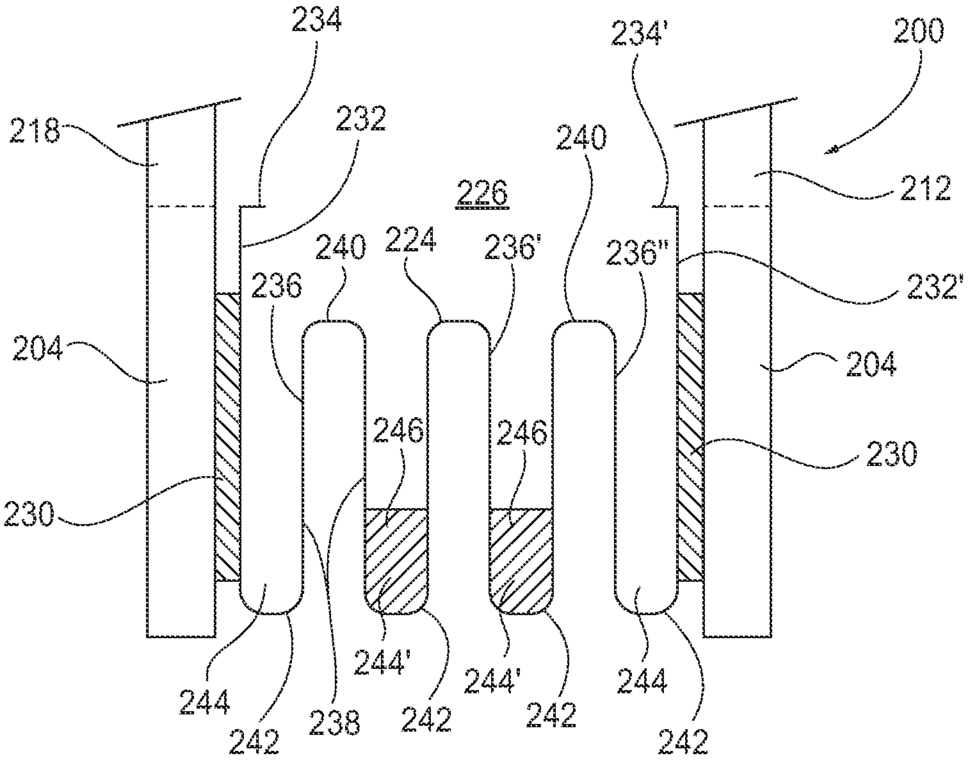
FIGS. 3A and 3B provide schematic cross-sectional views of a peripheral portion of an IGU depicting examples of a spacer as described herein.

According to one aspect or embodiment, a spacer is provided for use in an IGU, such as described in connection with FIGS. 1A, 1B, and 2. FIGS. 3A, 3B, 4A, and 4B each depict cross-sections of exemplary spacers incorporated into an IGU. FIG. 3A depicts a peripheral portion 204 of an IGU 200, and depicts a first panel 212, a second panel 218, and a spacer 224, defining a chamber 226, e.g., as described in connection with FIGS. 1A, 1B and 2 (chambers 26, 26', 26", 126). FIGS. 3A, 3B, 4A, and 4B, for simplicity, depict only a peripheral portion of one side of the IGU. The spacer is attached to and extends continuously around the peripheral portion 204 of IGU 200, for example as depicted in FIG. 2. Adhesive 230 is used to affix the spacer 224 between panels 212, 218. The spacer comprises lateral walls 232, 232', each having a lip 234, 234' extending inwardly towards the opposite lip 234, 234'. The lips 234, 234' define a gap therebetween. Depicted are three longitudinally-extending ridges 236, 236', and 236" that extend along the length of the spacer 224. The ridges 236, 236', 236" each comprise two walls 238, connected by a peak portion 240 (labeled in FIG. 3A only for first lateral ridge 236). Lateral ridges 236 and 236" are attached to adjacent lateral walls, 232 and 232', and ridges 236, 236', 236" are attached to each other by a valley portion 242, which define, on the chamber or interior side of the spacer 224 lateral valleys 244 and central valleys 244'. A desiccant matrix 246 is deposited in the central valleys 244'.

Figure 3B:
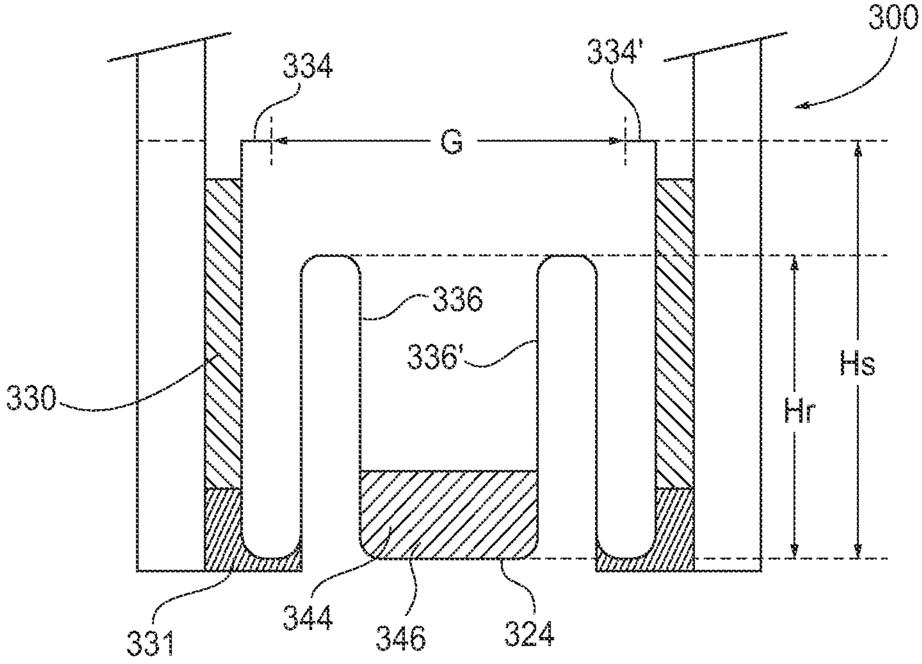

FIG. 3B depicts a peripheral portion of an IGU 300, substantially as described with regard to FIG. 3A. The spacer 324 is affixed to the panels 212, 218 using two different adhesives 330 and 331. Adhesive 330 may be hot melt butyl, polyisobutylene (PIB), or hot applied curable material and adhesive 331 may be silicone, polysulfide, polyurethane, hot applied butyl, or a hot-applied curable material. The spacer 324 includes two longitudinally-extending ridges 336, 336' defining a central valley 344 into which a desiccant matrix 346 deposited. A gap G between lips 334 and 334' is depicted, as is the height Hs of the spacer, and the height $H_R$ of the ridges 336, 336', which measurements are applicable to the various examples of spacers described herein. The height Hs of the spacer and the height $H_R$ of the ridges are measured in the same direction and may be measured perpendicular to the longitudinal axis of the spacer, and parallel to the panels or the lateral walls of the spacer, representing the shortest distance from the most peripheral point, e.g., the bottom of the valleys, and the most internal point, e.g., the lips or the gap between the lips, of the spacer.

Figure 3C:
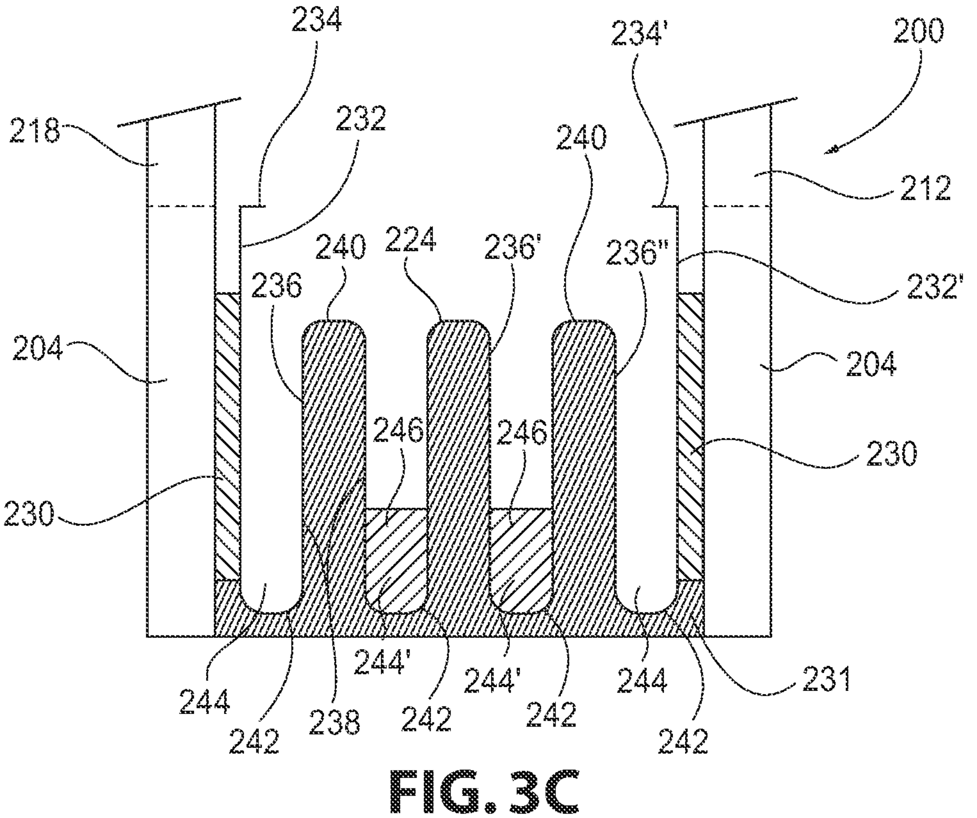
FIG. 3C provides a schematic cross-sectional view of a peripheral portion of an IGU depicting examples of a spacer as described herein with additional adhesive spread throughout certain portions.

FIG. 3C depicts a further variation of the spacer 224 of FIG. 3A. As shown in FIG. 3C, adhesive 231 is distributed between the panels 212 and 218 below the valley portions 242. The adhesive 231 is also distributed into the space 233 formed between the two walls 238 and connecting peak portions 240 of the ridges 236, 236', 236". It is appreciated that the adhesive 231 can comprise any of the materials previously described with respect to adhesive 331, such as for example silicone, polysulfide, polyurethane, hot applied butyl, or a hot-applied curable material.

Figure 3D:
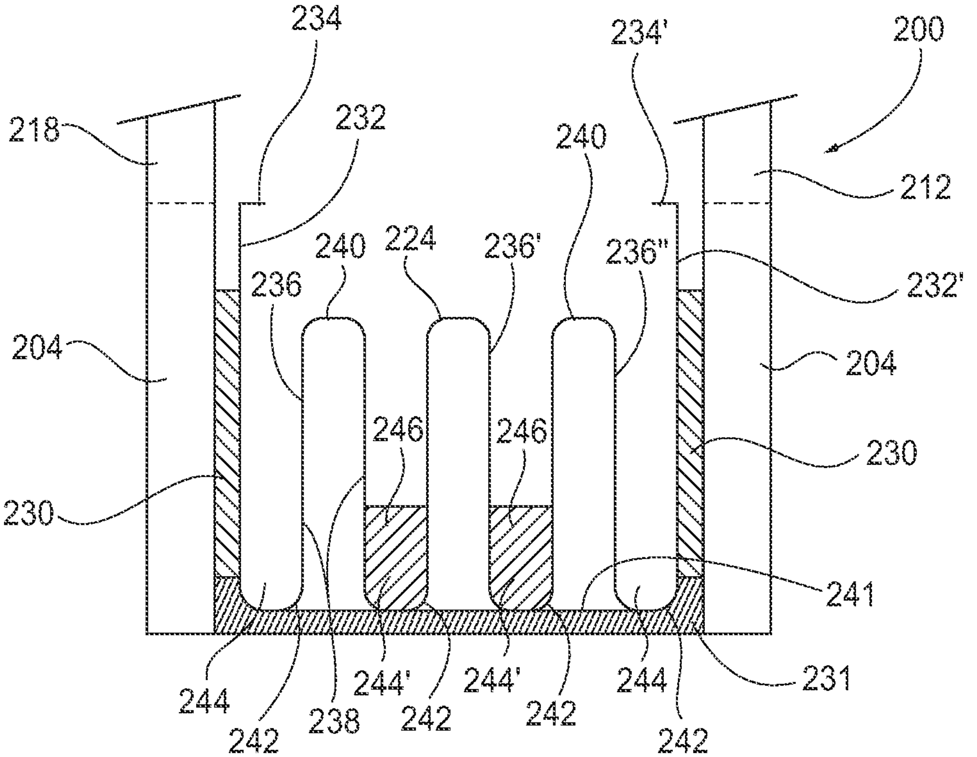
FIG. 3D provides a schematic cross-sectional view of a peripheral portion of an IGU depicting examples of a spacer as described herein with a barrier member extending across valley portions of the spacer and additional adhesive spread throughout other portions.

FIG. 3D depicts yet another variation of the spacer 224 of FIGS. 3A and 3C. As shown in FIG. 3D, a barrier member 241 is placed across the valley portions 242 and extends across all the valley portions 242 to block access to the space 233 formed between the two walls 238 and connecting peak portions 240 of the ridges 236, 236', 236". As further shown in FIG. 3D, adhesive 231 is distributed between the panels 212 and 218 below the valley portions 242. Because the barrier member 241 is placed across the valley portions 242, adhesive 231 does not enter the space 233 formed between the two walls 238 and connecting peak portions 240 of the ridges 236, 236', 236". Rather, the space 233 formed between the two walls 238 and connecting peak portions 240 of the ridges 236, 236', 236" is filled with air. The barrier member 241 can comprise any material that can be attached to the valley portions 242 and which prevents adhesive 231 from entering the space 233, such as a for example a tape that can be adhered to the valley portions 242 and prevents adhesive 231 from entering the space 233. It is appreciated that less adhesive 231 is used to cover the area under the valley portions 242 when the barrier member 241 is used.

Figure 4A:
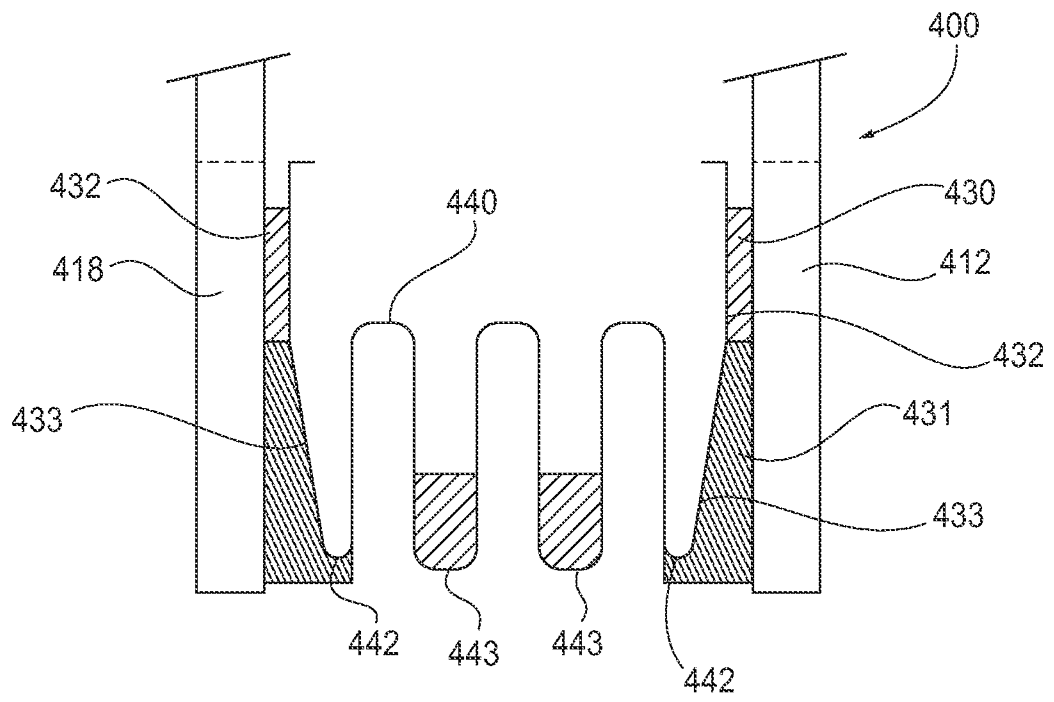
FIGS. 4A and 4B provide schematic cross-sectional views of a peripheral portion of an IGU depicting examples of a spacer as described herein.
Figure 4B:
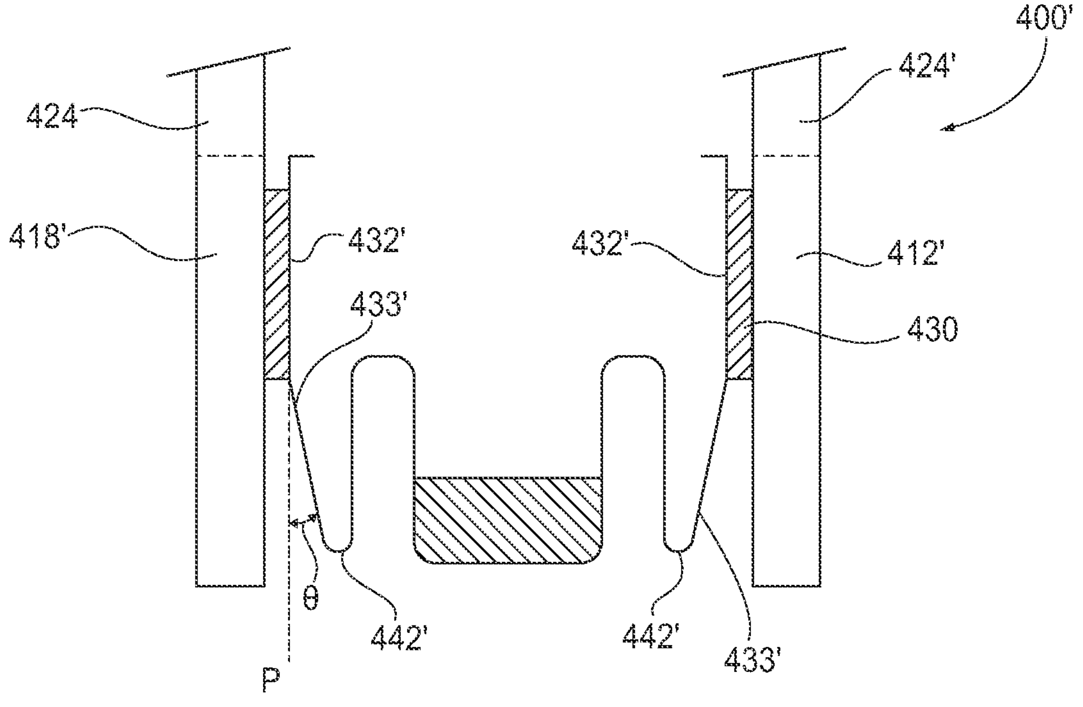

FIGS. 4A and 4B depict IGUs 400, 400' that include variations of the spacer 224 and 324 of FIGS. 3A and 3B, respectively. All elements of IGUs 400, 400' are essentially as depicted in FIGS. 3A and 3B. Spacers 424, 424' comprise lateral walls 432, 432' and lateral valleys 442, 442', with lateral folds 433, 433' connecting the lateral walls 432, 432' and lateral valleys 442, 442'. The lateral folds 433, 433' extend at an angle θ from a plane P of the lateral walls 432, 432', as shown in FIG. 4B, which may be any angle θ between 0° and 90°, such as 5°, 10°, 22.5°, 30°, 45°, or 60° and may be the same or different for lateral folds 433 and 433'. In a variation of the ridges depicted in FIGS. 3A and 3B, peak portions 440 and central valley portions 443 are squared, or comprise planar portions perpendicular to the lateral walls 432. The squaring of the valley portions 443 and peak portions 440 impart different mechanical strength to the spacer 424 and therefore to the IGU 400, allowing for tailoring of the mechanical strength of the IGU, for example compressibility. Optionally, lateral valley portions 442 may be squared as with central valley portions 443. Any IGU described herein may include, independently, more or less rounded, or more or less squared, peak portions and/or valley portions as design variants.

A spacer, as described herein, for example in FIGS. 3A, 3B, 3C, and 3D, may be formed from a single sheet of metal. The metal from which the spacer is formed may be stainless steel or tin-plated steel. A spacer frame, that surrounds the internal cavity of an IGU as described herein, may be formed from a single contiguous sheet of metal, or by joining two or more separate spacer frame portions formed from two or more sheets of metal. For ease of manufacture, it may be preferred that the spacer frame is formed from a single sheet of metal, for example as described below.

In the context of the IGUs and spacers described herein, "parallel" means that a portion of a stated element, such as a wall of the spacer is parallel to the plane of the referenced element, such as a panel, within practical manufacturing tolerances, e.g., within ±1° of parallel. "Substantially parallel," meaning that a portion of a stated element, such as a wall of the spacer is parallel to, or within ±1°, ±2°, ±3°, ±4°, or ±5° of the plane of the referenced planar element, such as a panel. Likewise, "perpendicular" means that a portion of a stated element, such as a wall of the spacer is perpendicular to the plane of the referenced planar element, such as a panel, within practical manufacturing tolerances, e.g., within ±1° of perpendicular (90°). "Substantially perpendicular" refers to a portion of a stated element, such as a wall of the spacer is perpendicular to, or within ±1°, ±2°, ±3°, ±4°, or ±5° of a plane perpendicular to a plane of the referenced planar element, such as a panel.

By "free of desiccant", e.g., in the context of valleys formed by ridges on the internal side of the spacer, it is meant that the valleys, e.g., the lateral valleys, do not contain desiccant, or only contain small amounts of desiccant, for example as compared to the central valleys, for example as a result in inaccuracy of deposition or movement of the desiccant matrix during manufacture of an insulated glazing unit, within manufacturing tolerances.

Figure 5:
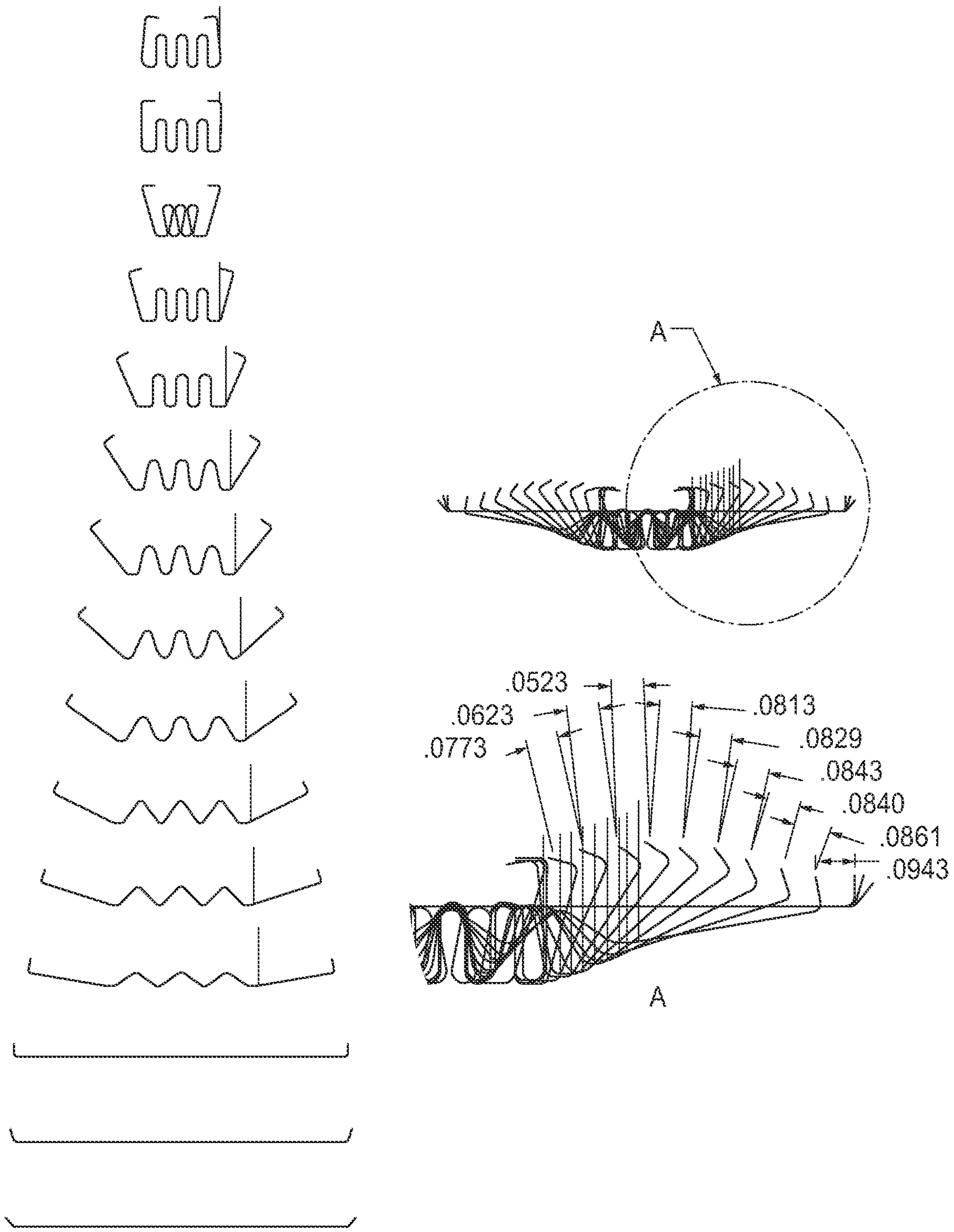
FIG. 5 depicts schematically a step-wise roll-forming process useful in preparation of the spacers described herein.

The spacers may be prepared by any useful method. Because the spacers may be prepare from a single coil of metal stock, roll-forming may be preferred for preparing the spacer as depicted schematically in FIG. 5. In roll-forming, a metal strip passes through sets of rolls mounted on consecutive stands, each set performing only an incremental part of a desired bend, until the desired cross-section (profile) is obtained. In FIG. 5, coiled metal stock is uncoiled and is fed sequentially through roll stations (not depicted) to produce stock spacer. Referring to FIG. 5, left, the forming process proceeds from a sheet (bottom, showing the first incremental folding to form the lips) to the fully-formed spacer profile (top). FIG. 5, right, shows the sheet overlayed at various folding stages, to depict the progress of the folding and the increments at each step (bottom) for one example of a spacer configuration. One spacer profile is depicted in FIG. 5, though any spacer profile, such as those depicted in FIG. 3A, 3B, 4A, or 4B, may be prepared in this manner. The spacer is cut to length after roll-forming, and the lineal key tab is swaged for end-joining the spacer after folding. Corner clearances, end-swaging, and muntin bar locators may be cut into the metal stock prior to roll-forming, or after roll-forming the spacer. Adhesive, such as a hot-melt butyl or hot-applied curable material and desiccant matrix, e.g. a polyisobutylene (PIB) adhesive, for example as are broadly-known in the art, are applied to the spacer after formation and cutting. Desiccant matrix is deposited in central valleys of the spacer, and not to lateral valleys of the spacer, before, during, or after application of the adhesive to the lateral walls of the spacer, e.g., as depicted in FIGS. 3A, 3B, 4A, and 4B. Desiccant matrix is not applied at the corners, that is, at or adjacent to corner clearances cut in the spacer. Continuing in the production line, after roll forming and deposition of adhesive and desiccant, the spacer may folded into shape using interior and exterior forming dies, and the swaged ends may be joined by any useful method.

Figure 6:
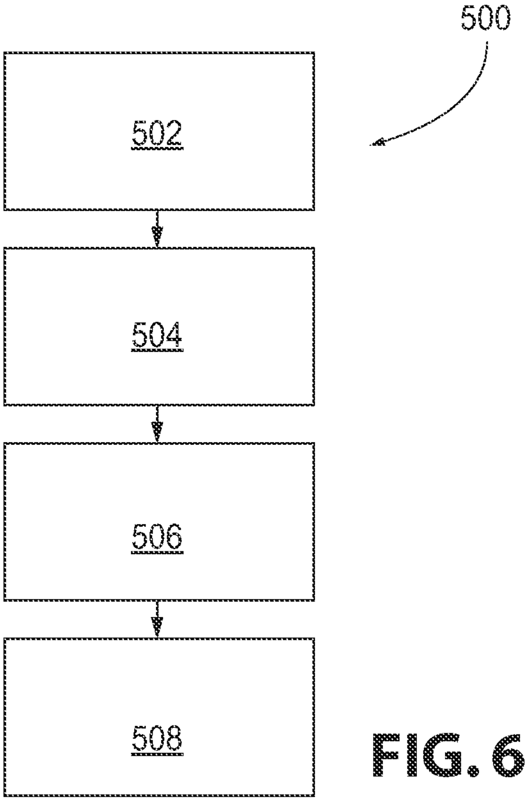
FIG. 6 is a flow diagram providing an overview of a method of preparing an IGU as described herein.

FIG. 6 is a flow diagram providing an overview of a method 500 of preparing an IGU as described herein that can be performed as a continuous process that is substantially automated (see Examples 1 and 2, below). As described in connection with FIG. 5, coiled stock is roll-formed and cut 502 into individual spacer units. Desiccant and adhesive is then applied 504. Using internal and external dies, the spacer is folded 506 into a desired shape, such as a rectangular frame. The Frame is further processed 508 by adding the panels and air or an inert gas into the interior compartment. Muntins also may be added at this step 508. Steps 502, 504, and 506 may be fully automated. Step 508 may be fully automated, or workers may assist in the assembly of the IGU.

Figure 7:
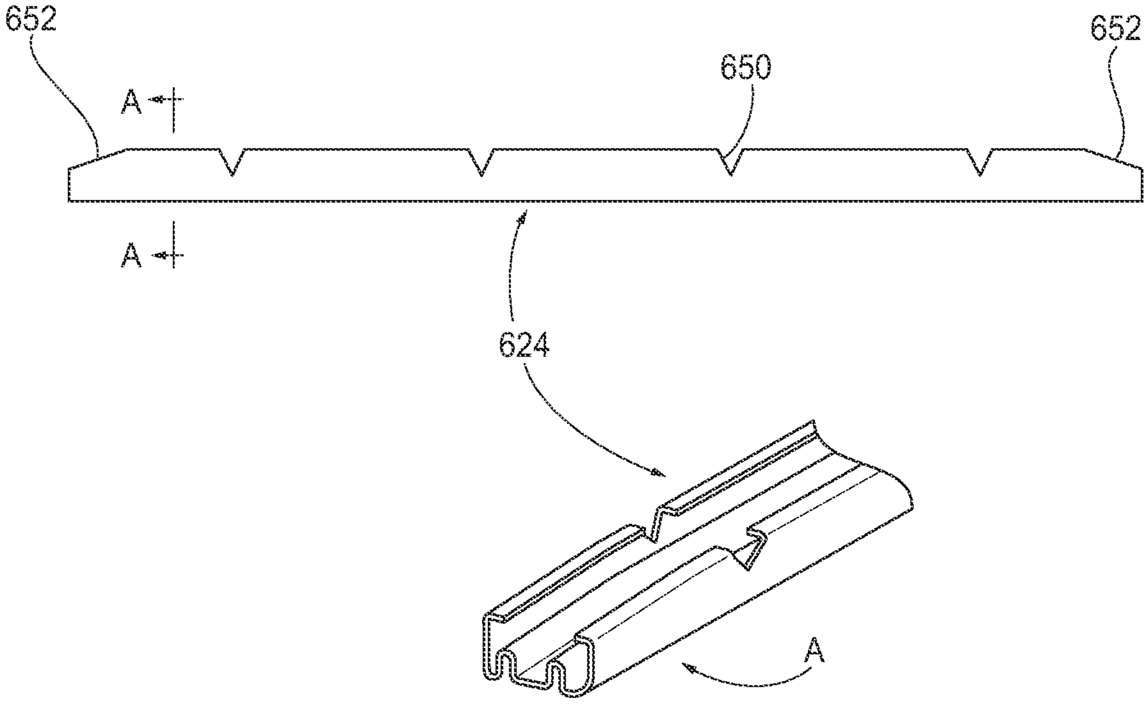
FIG. 7 provides two views of a spacer essentially as depicted in FIG. 3B, and including corner clearances and swaged ends. The cross-section depicted in the lower figure is at point A of the upper figure.
Figure 8:
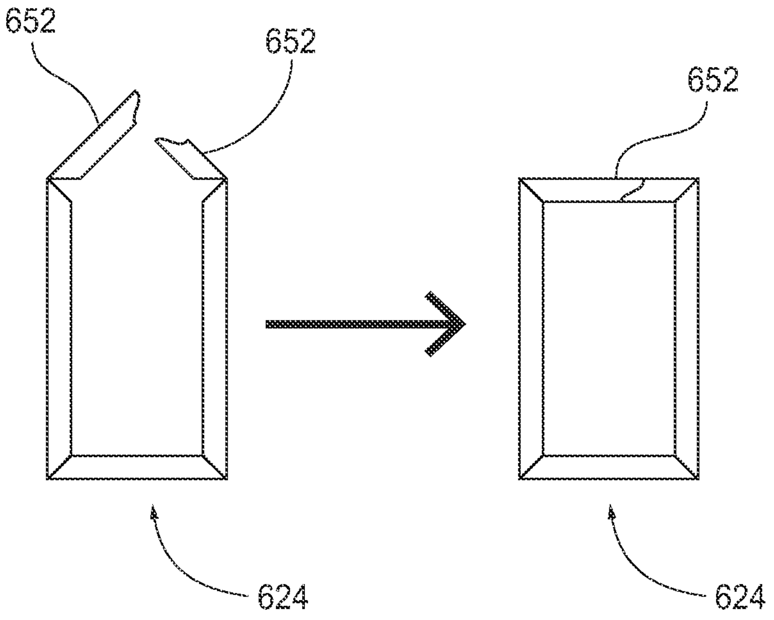
FIG. 8 show schematically a spacer partially (left) and fully (right) folded into a spacer frame for use in an IGU.

An example of a spacer 624 is shown in FIG. 7. FIG. 7 provides two views of a spacer essentially as depicted in FIG. 3B, including corner clearances 650 and swaged ends 652, which assist in formation of a spacer frame from the spacer. FIG. 8 depicts the spacer 624 of FIG. 7, partially folded (left) with the swaged ends not joined, and fully folded (right), with the swaged ends locked in place. The swaged ends may be locked in place by any useful method, either mechanically, e.g. using tabs, welded, or by any useful method.

The spacer, such as a spacer as depicted in FIGS. 7 and 8, may be bent as shown in FIG. 8 by mandrel bending using internal and external dies.

Figure 9A:
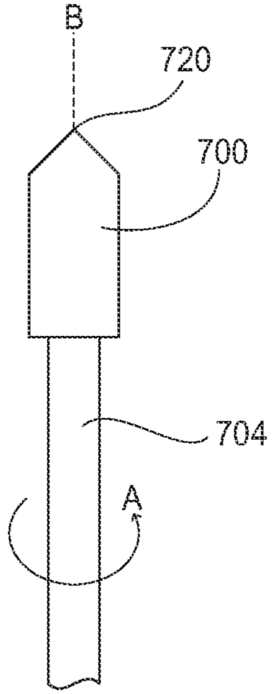
FIGS. 9A and 9B depict schematically an internal die for use in bending a spacer as described herein.
Figure 9B:
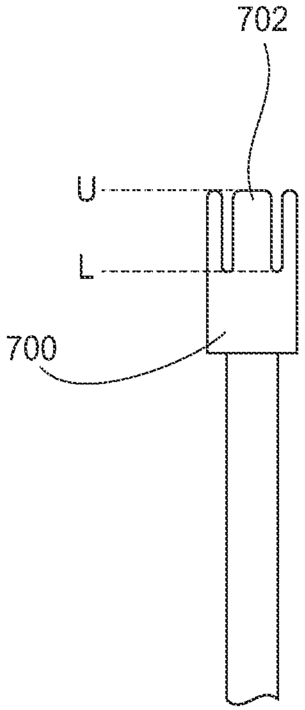

FIGS. 9A and 9B depict schematically an internal die 700, with FIG. 9B being rotated 90° as shown in FIG. 9A at A. FIG. 9B is a cross-section of the device the internal die 700 at B. The internal die 700 includes protuberances 702 that match the internal shape of a spacer, such as spacer 324 of FIG. 3B, depicting upper U and lower L limits or boundaries of protuberances 702. The internal die 700 is attached to any suitable mechanical actuator via rod 704. As would be recognized, the actuation of the internal die 700 can be accomplished by a significant variety of mechanical mechanisms, a rod and a suitable actuator for the rod, such as a cam or lever (not shown), being merely exemplary.

Figure 10A:
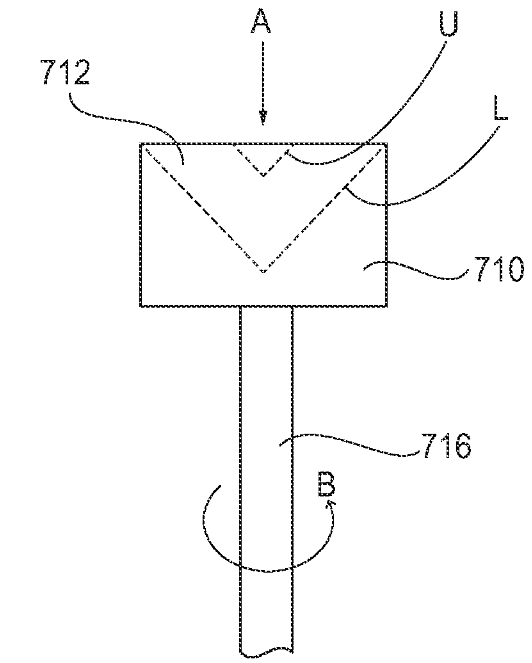
FIGS. 10A and 10B depict schematically an external die for use in bending a spacer as described herein.
Figure 10B:
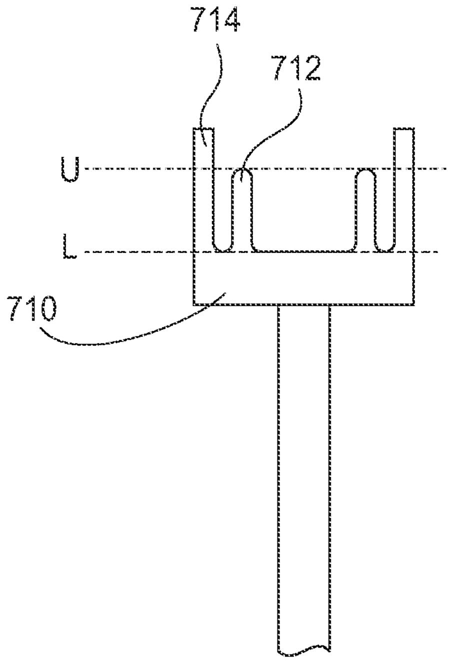

FIGS. 10A and 10B depict external die 710, with FIG. 10B being rotated 90° as shown in FIG. 10A at B. FIG. 10B is a cross section of 10A at A. External die 710 includes protuberances 712 and peripheral guides 714 and may be attached to any suitable mechanical actuator via rod 716. As would be recognized by one of ordinary skill, the actuation of the external die 710 can be accomplished by a significant variety of mechanical mechanisms, a rod and a suitable actuator for the rod, such as a cam or lever (not shown), being merely exemplary. Internal die 700 fits or nests within external die 710, with a suitable gap to accommodate the thickness of a spacer placed between the dies 700, 710. Tip 720 of the internal die 700 may be rounded. FIG. 10A depicts upper limits or boundaries U and lower limits or boundaries L of the protuberances 712.

Figure 11:
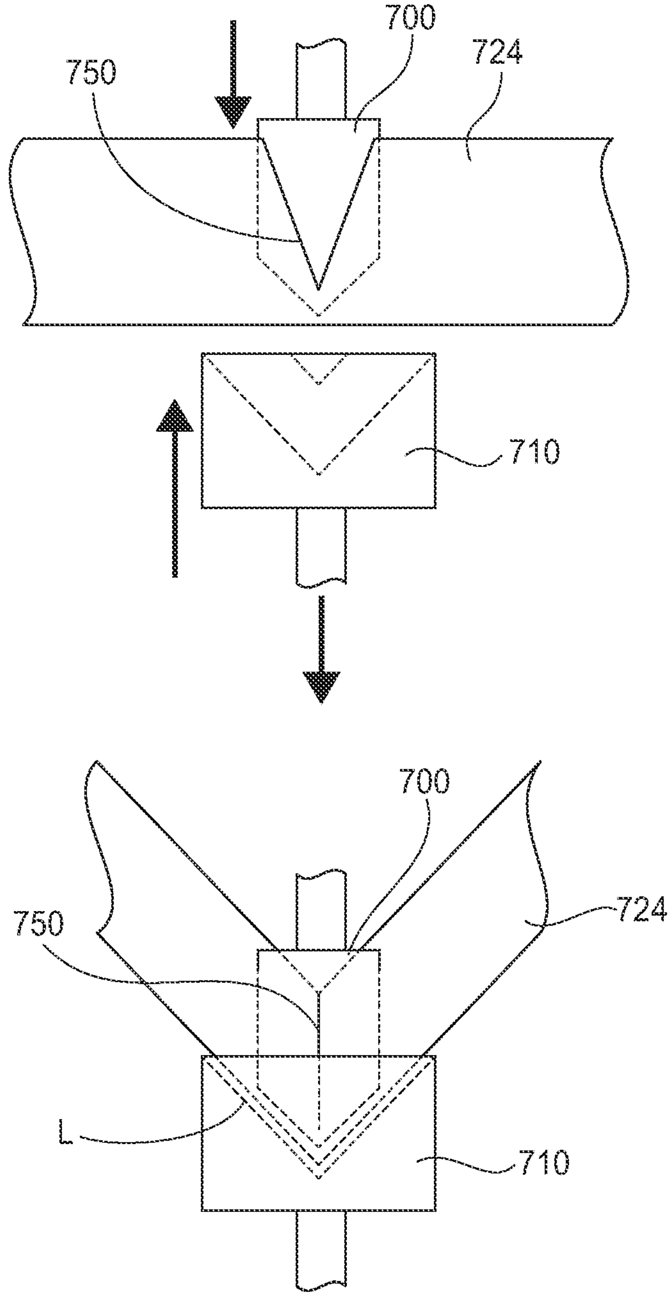
FIG. 11 is a schematic partial view of internal and external dies in use bending a spacer.

FIG. 11 depicts dies 700 and 710 in use. Die 700 is placed internal to a spacer 724 at a location of a corner clearance 750, and external die 710 is aligned external to the spacer 724. As described herein, the area of the corner clearance 750 is free of desiccant matrix and adhesive, to facilitate the bending process. Protuberances of the internal and external dies 700, 710 are aligned with ridges of the spacer 724. Protuberances of the dies 700, 710 and ridges of the spacer 724 are not shown in FIG. 11 for clarity. The internal and external dies 700, 710 are moved together as shown by the arrows (top), and bend the spacer 724 to a final, bent configuration (bottom), with edges of the corner clearance 751 either meeting, or alternatively, overlapping or not meeting, depending on the shape of the corner clearance 750. The use of the two dies 700, 710 in mandrel bending results in a bent corner with metal of the spacer being bent and/or stretched in the mandrel bending process.

Figure 12:
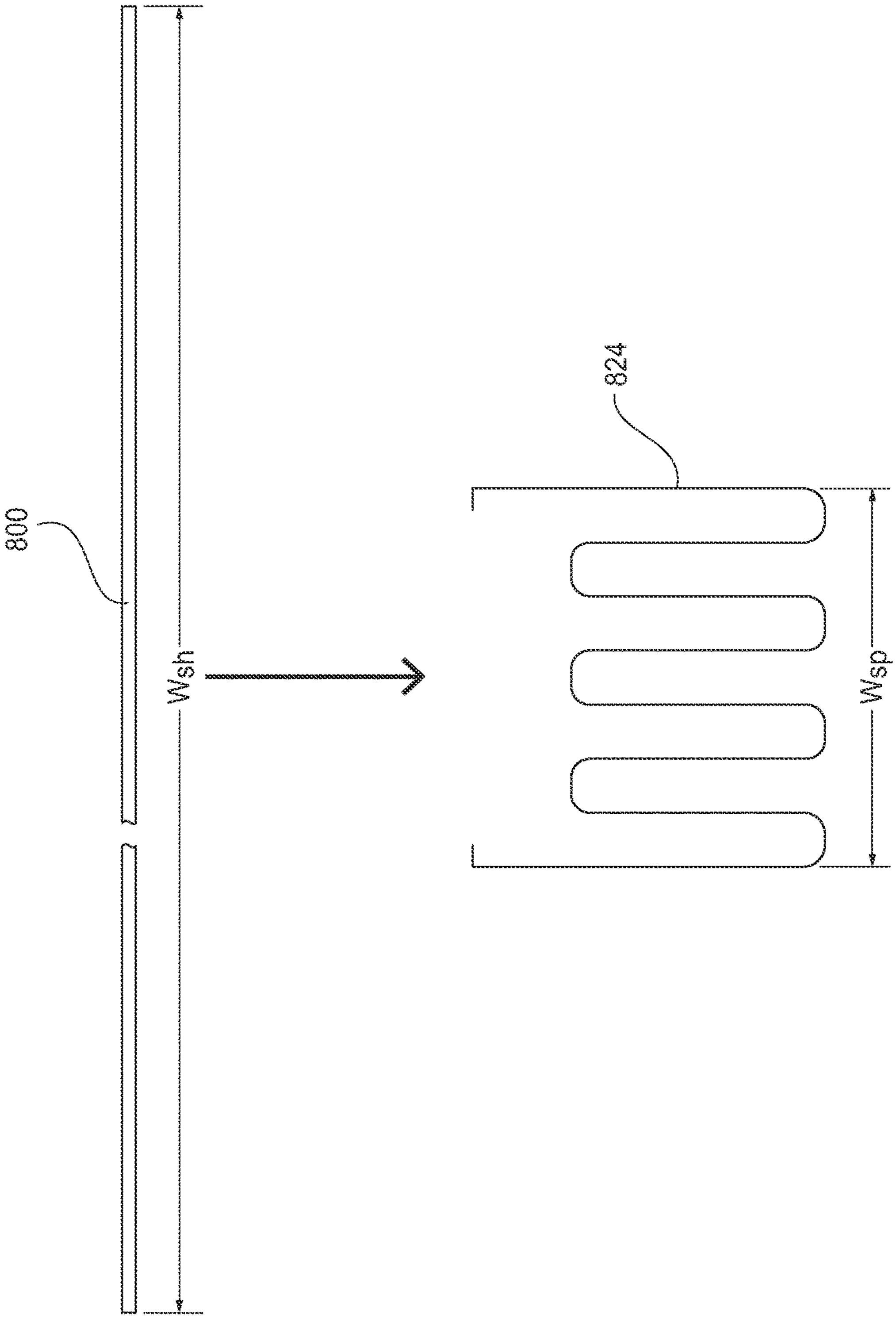
FIG. 12 depicts a metal sheet (top) and a spacer formed from the metal sheet (bottom).

The spacers described herein exhibit exceptional insulation, e.g., Res-values, when incorporated into an IGU. FIG. 12 depicts a metal sheet 800 and a spacer formed from the metal sheet 824, essentially as depicted in FIG. 3A. The metal sheet has a linear width $W_{sh}$ and is folded longitudinally to form a spacer having a width $W_{sp}$. In certain aspects, the spacer is folded in a shape in which $W_{sp}/W_{sh}\times 100\%$ is 36% or less, 35% or less, e.g., 25% or less, 20% or less, or 15% or less, e.g., ranging from 15% to 35%, or from 21% to 30%. This high degree of folding results in superior resistance to heat flow, or insulative capacity when incorporated into an IGU.

In certain aspects, the thermal resistance (Res-value [(in-hr-° F.)/BTU]) of the spacer when incorporated into an IGU is at least 175, at least 190, at least 175, at least 190, at least 195, at least 200, at least 205, at least 210, or at least 215. U.S. Pat. Nos. 5,655,282, 5,675,944 and 6,115,989, among many others, describe IGUs, methods of making IGUs, and various applicable standards for assessing the insulating capacity of IGUs. IGUs may be used to reduce heat transfer between the outside and inside of a home or other structures. A measure of insulating value generally used is the "U-value". The U-value is the measure of heat in British Thermal Unit (BTU) passing through the unit per hour (hr)-square foot (ft$^2$)-degree Fahrenheit (° F.) (Formula 1):

$$\frac{\text{BTU}}{(\text{hr})(\text{ft}^2)(^\circ\ \text{F.})}. \quad (1)$$

The lower the U-value the better the thermal insulating value of the unit, e.g., higher resistance to heat flow resulting in less heat conducted through the unit. Another measure of insulating value is the "R-value" which is the inverse of the U-value. Still another measure is the resistance to heat flow (Res-value) which is stated in hr-° F. per BTU per inch of perimeter of the unit (Formula 2):

$$\frac{(\text{hr})(^\circ\ \text{F.})}{\text{BTU/in}}. \quad (2)$$

Modeling software, such as ANSYS finite element code (i.e. ANSYS; Finite Element Program {FEA}, Release 14, SAS IC. Inc. 2012), may be used to determine the Res-value (see, e.g., European Patent Application Publication Number 0 475 213 A1 and U.S. Pat. Nos. 5,531,047 and 5,655,282). The result of the ANSYS calculation is dependent on the geometry of the cross section of the edge assembly and the thermal conductivity of the constituents thereof. The geometry of any such cross section may be measured by studying the unit edge assembly.

In some aspects, the edge resistance of the edge assembly (hr·° F.·in/BTU) is defined by the inverse of the flow of the (BTU/hr·° F.·in.), calculated by ANSYS, that occurs from the interface of the glass and adhesive layer at the inside side of the unit to the interface of the glass and adhesive layer of the outside of the unit per unit increment of temperature (1° F.), per unit length of edge assembly perimeter (inch). The glass/adhesive interfaces are assumed to be isothermal to simplify the model.

As such, in certain examples, a spacer is provided, and an IGU is provided, where the spacer is formed from a single, folded metal sheet, such as a stainless steel or tin-plated steel sheet, where $Ws_p/W_{sh}\times100\%$ is 36% or less, at most 35%, e.g., 25% or less, 20% or less, or 15% or less, e.g., ranging from 15% to 35%, or from 21% to 30%, and having a Res-value of at least 175, at least 190, at least 175, at least 190, at least 195, at least 200, at least 205, at least 210, or at least 215 when the spacer is incorporated into an IGU.

Comparative Example 1

Spacers are automatically formed as follows: Flat metal coil is fed from an uncoiler to a feeder press where corners, muntin bar locators, corner tabs, and gas fill holes are punched. After punching, the flat coil stock advances to a roll former where it is bent into the proprietary U-shape. At the roll former exit, individual IGU spacers are automatically cut to length, corner tabs are swaged, and advanced via a conveyor belt to the adhesive and desiccant matrix extruder.

Adhesive (usually a hot melt butyl or hot applied curable material) and desiccant matrix is applied by the extruder in a linear fashion to the un-bent spacer as it advances on a conveyor belt. A worker folds the spacer (with adhesive and desiccant matrix applied), inserts the preformed tab to form a rectangular shape and hangs it on the overhead conveyor. Two glass lites are washed in a horizontal washer and advance to the spacer topping station. A worker removes a spacer from the overhead conveyor and with assistance from a second worker places the spacer on the first glass lite. The two workers then place the second glass lite on top of the spacer. Low strength adhesion is established via the initial adhesive "tack" and the IGU advances to the heated oven/roll press. Final overall thickness, adhesive bond line width, and adhesion is achieved by high heat and pressure through the continuously moving oven/roll press. Workers inspect and offload the IGUs and place them on transport racks for cooling. After the IGUs reach room temperature, they are argon filled via lances in batches of 5 at a time by a worker. After argon filling is complete, screws are inserted in the fill holes and a hot melt butyl patch is applied by a worker. The IGUs are finished and ready for installation in the window sash.

Comparative Example 2

Metal spacer material is roll formed and cut into standard lengths. This is often done at a dedicated plant outside of the IGU manufacturing facility. A section of formed spacer metal is cut to length by a worker. The spacer metal is bent to the desired rectangular shape (corners formed) by a worker. A worker drills holes in the spacer to enable desiccant bead filling. Desiccant beads "injected" into spacer by the same worker. Drilled holes are manually patched closed with foil tape or butyl adhesive by the same worker. Primary adhesive (polyisobutylene or PIB) is applied by a worker using a "cartwheel" motion with a PIB extruder. Spacer is placed on overhead conveyor. The first lite of glass exits the vertical glass washer and advances to the spacer topping station. Spacer is removed from overhead conveyor and positioned by a worker on the first glass lite. The glass and spacer advance to the argon filling press. The second glass exits the washer and advances to the argon filling press. The two glass lites are flooded with argon and pressed together. Low strength adhesion is achieved via the PIB, forming the IGU. The IGU advances to the secondary adhesive robot. Secondary adhesive (usually silicone or polysulfide—sometimes polyurethane, hot applied butyl, or a hot applied curable material) is applied to the back of the spacer. The finished IGU exits the robot sealer and is inspected then removed from the manufacturing line. The IGUs are finished and ready for installation in the window sash.

Comparative Example 3

Metal spacer material is roll formed and cut into standard lengths (e.g., about 21' long). This is often done at a dedicated plant outside of the IGU manufacturing facility. A section of formed spacer metal is cut to length by a worker. A lineal key is inserted in one end of the spacer by a worker. Desiccant beads are filled through the open end. The spacer metal is bent to the desired rectangular shape (corners formed). Primary adhesive (PIB) is applied by a worker using a "cartwheel" motion with a PIB extruder. Spacer is placed on overhead conveyor. The first lite of glass exits the vertical glass washer and advances to the spacer topping station. Spacer is removed from overhead conveyor and positioned by a worker on the first glass lite. The glass and spacer advance to the argon filling press. The second glass exits the washer and advances to the argon filling press. The two glass lites are flooded with argon and pressed together. Low strength adhesion is achieved via the PIB, forming the IGU. The IGU advances to the secondary adhesive robot. One part silicone secondary adhesive is applied to the back of the spacer. The finished IGU exits the robot sealer and is inspected then removed from the manufacturing line. The IGUs are finished and ready for installation in the window sash.

Example 1—Single Seal Insulating Glass

Spacers are automatically formed by the machine in the following order: Flat metal coil is fed from an uncoiler to a feeder press where muntin bar locators and corner clearances are punched. After punching, the flat coil stock advances to a roll former where it is bent into the proprietary shape. At the roll former exit, individual IGU spacers are automatically cut to length, the lineal key tab is swaged, and advanced via a conveyor belt to the adhesive and desiccant matrix extruder.

Adhesive (usually a hot melt butyl or hot applied curable material) and desiccant matrix is applied by the extruder in a linear fashion to the un-bent spacer as it advances on a conveyor belt. Desiccant matrix is not applied to the corner areas.

The spacer bender bends the spacer by use of interior and exterior forming dies, referred to herein as mandrel bending. The same machine inserts the swaged end of the spacer into the trailing end of the spacer. Spacer joining techniques may include: spot welding, positive locking/mating stamped sections, adhesive adhesives, and foil tapes. The finished spacer is collected by an automated overhead conveyor.

Two glass lites are washed in a horizontal washer and advance to the spacer topping station.

A worker removes a spacer from the overhead conveyor and with assistance from a second worker places the spacer on the first glass lite.

The two workers then place the second glass lite on top of the spacer. Low strength adhesion is established via the initial adhesive "tack" and the IGU advances to the heated oven/roll press.

Final overall thickness, adhesive bond line width, and adhesion is achieved by high heat and pressure through the continuously moving oven/roll press.

Workers inspect and offload the IGUs and place them on transport racks for cooling.

After the IGUs reach room temperature, they are argon filled via lances in batches of 5 at a time by a worker.

After argon filling is complete, screws are inserted in the fill holes and a hot melt butyl patch is applied by a worker. The IGUs are finished and ready for installation in the window sash.

Example 2—Dual Seal Insulating Glass

Spacers are automatically formed by the machine in the following order: Flat metal coil is fed from an uncoiler to a feeder press where muntin bar locators and corner clearances are punched. After punching, the flat coil stock advances to a roll former where it is bent into the proprietary shape. At the roll former exit, individual IGU spacers are automatically cut to length, the lineal key tab is swaged, and advanced via a conveyor belt to the primary adhesive and desiccant matrix extruder.

Primary adhesive (e.g., polyisobutylene, PIB) and desiccant matrix is applied by the extruder in a linear fashion to the un-bent spacer as it advances on a conveyor belt. Desiccant matrix is not applied to the corner areas.

The spacer bender bends the spacer by use of interior and exterior forming dies. The action is described as mandrel bending. The same machine inserts the swaged end of the spacer into the trailing end of the spacer. Spacer joining techniques may include: spot welding, positive locking/mating stamped sections, adhesive adhesives, and/or foil tapes. The finished spacer is collected by an automated overhead conveyor.

The first lite of glass exits the vertical glass washer and advances to the spacer topping station Spacer is removed from overhead conveyor and positioned by a worker on the first glass lite. The glass and spacer advance to the argon filling press.

The second glass exits the washer and advances to the argon filling press.

The two glass lites are flooded with argon and pressed together. Low strength adhesion is achieved via the PIB, forming the IGU. The IGU advances to the secondary adhesive robot.

Secondary adhesive (usually silicone or polysulfide—sometimes polyurethane, hot applied butyl, or a hot applied curable material) is applied to the back of the spacer.

The finished IGU exits the robot sealer and is inspected, then removed from the manufacturing line. The IGUs are finished and ready for installation in the window sash.

Example 3—Dual Seal Insulating Glass with Barrier Member

Spacers are automatically formed by the machine in the following order: Flat metal coil is fed from an uncoiler to a feeder press where muntin bar locators and corner clearances are punched. After punching, the flat coil stock advances to a roll former where it is bent into the proprietary shape. At the roll former exit, individual IGU spacers are automatically cut to length, the lineal key tab is swaged, and advanced to a barrier member applicator (example of such is a pressure sensitive tape), then advances via a conveyor belt to the primary adhesive and desiccant matrix extruder.

Primary adhesive (e.g., polyisobutylene, PIB) and desiccant matrix is applied by the extruder in a linear fashion to the un-bent spacer as it advances on a conveyor belt. Desiccant matrix is not applied to the corner areas.

The spacer bender bends the spacer by use of interior and exterior forming dies. The action is described as mandrel bending. The same machine inserts the swaged end of the spacer into the trailing end of the spacer. Spacer joining techniques may include: spot welding, positive locking/mating stamped sections, adhesive adhesives, and/or foil tapes. The finished spacer is collected by an automated overhead conveyor.

The first lite of glass exits the vertical glass washer and advances to the spacer topping station Spacer is removed from overhead conveyor and positioned by a worker on the first glass lite. The glass and spacer advance to the argon filling press.

The second glass exits the washer and advances to the argon filling press.

The two glass lites are flooded with argon and pressed together. Low strength adhesion is achieved via the PIB, forming the IGU. The IGU advances to the secondary adhesive robot.

Secondary adhesive (usually silicone or polysulfide—sometimes polyurethane, hot applied butyl, or a hot applied curable material) is applied to the back of the spacer.

The finished IGU exits the robot sealer and is inspected, then removed from the manufacturing line. The IGUs are finished and ready for installation in the window sash.

Example 4—U-Factor Determination

Simulation results for fourteen spacers in a generic vinyl casement frame were obtained. One IGU with the same glass in each was built for a generic vinyl casement frame and evaluated with 14 different spacers. The data collected included U-factor (Center-of-Glass and Total Product), and also temperature of the glass in the sill sections. The glass option imported into each window was a 3 mm pane of Vitro Solarban®60 coated glass—½" gap of 90% Argon/10% Air—3 mm pane of clear glass. The ½" gap was modified if the spacer plus adhesive was not manufactured at exactly that dimension.

All software used was by Lawrence Berkley National Laboratory and is considered the industry standard: Window7 software used is version 7.4.14.0; Therm7 software used is version 7.4.4.0; International Glazing Data Base used is version 60. Table 1 includes Center-of-Glass U-factor, Total Window Product U-factor, and sill glass interior surface temperature at the glass sightline for experimental spacer 1, essentially shown in FIG. 3A, and various comparative examples.

Experimental SPACER 1:
- Spacer Height: 0.300"
- Ridge Spacing: 0.122"
- Metal thickness: 0.0077"
- Ridge height: 0.190"
- Overall width of spacer: 0.450"
- Adhesive thickness: 0.0235"
- Adhesive height: 0.273"
- Metal conductivity, emissivity: 7.875 BTU/hr-ft-F, 0.9
- Adhesive conductivity, emissivity: 0.139 BTU/hr-ft-F, 0.9
- Desiccant matrix conductivity, emissivity: 0.168 BTU/hr-ft-F, 0.9

TABLE 1

| Spacer Option | Argon Space, inches | U-factor COG | U-factor Total | Glass Temperature at Sill (° F.) |
|---|---|---|---|---|
| Vitro Intercept Ultra | 0.500 | 0.2471 | 0.2617 | 37.3 |
| Vitro Intercept Thinplate | 0.500 | 0.2471 | 0.2693 | 35.0 |
| Vitro Intercept Tinplate | 0.500 | 0.2471 | 0.2704 | 34.7 |
| Super Spacer Standard with 3⁄16" Secondary Seal | 0.500 | 0.2471 | 0.2593 | 37.9 |
| Super Spacer Premium Plus Enhanced with 3⁄16" Secondary Seal | 0.500 | 0.2471 | 0.2591 | 38.0 |
| Duralite | 0.500 | 0.2471 | 0.2539 | 39.6 |
| Duraseal | 0.500 | 0.2471 | 0.2654 | 36.4 |
| Tremco EnerEDGE with 3⁄16" Secondary Seal | 0.500 | 0.2471 | 0.2572 | 38.6 |
| Kommerling Kodispace 4SG TPS | 0.500 | 0.2471 | 0.2581 | 38.4 |
| Cardinal XL Edge | 0.490 | 0.2469 | 0.2632 | 36.8 |
| Cardinal Endur | 0.490 | 0.2469 | 0.2606 | 37.5 |
| Swiss Spacer Ultimate with 3⁄16" Secondary Seal | 0.517 | 0.2483 | 0.2578 | 38.8 |
| Allmetal Aluminum with 3⁄16" Secondary Seal | 0.500 | 0.2471 | 0.2847 | 28.8 |
| Intercept QUANTUM SingleSeal | 0.500 | 0.2471 | 0.2547 | 38.6 |
| Intercept QUANTUM DualSeal | 0.500 | 0.2471 | 0.2538 | 38.7 |
| Intercept QUANTUM Thinplate SingleSeal | 0.500 | 0.2471 | 0.2624 | 36.5 |
| Intercept QUANTUM Thinplate DualSeal | 0.500 | 0.2471 | 0.2614 | 36.8 |

Example 4—Res-Value Determination

Res values were modeled for a number of variations of the spacer described herein and were compared to values obtained from commercial comparative examples, as well as other spacer variations. Res-values, or edge resistance values ((in-hr-° F.)/BTU) were determined essentially as described in European Patent Application Publication Number 0 475 213 A1 and U.S. Pat. Nos. 5,531,047 and 5,655,282, among others. In short, the edge resistance of the edge assembly (hr·° F.·in/BTU) was defined by the inverse of the flow of the (BTU/hr·° F.·in.), calculated by ANSYS, that occurs from the interface of the glass and adhesive layer at the inside side of the unit to the interface of the glass and adhesive layer of the outside of the unit per unit increment of temperature (1° F.), per unit length of edge assembly perimeter (inch). The glass/adhesive interfaces are assumed to be isothermal to simplify the model.

Figure 13:
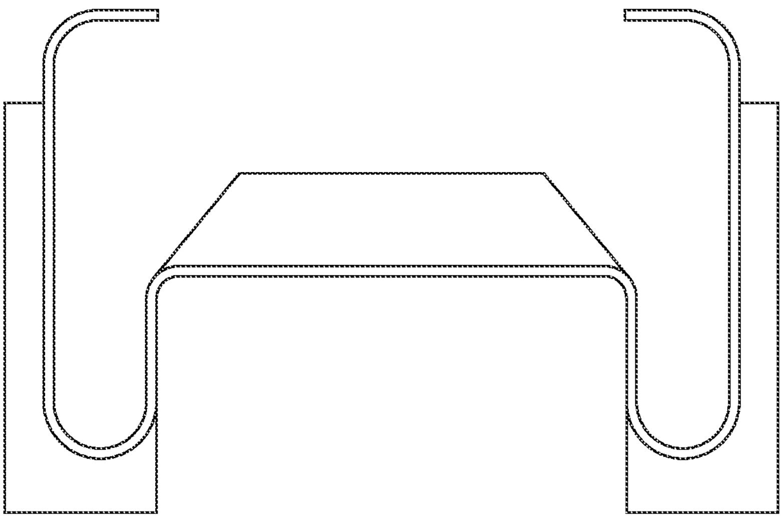
FIG. 13 provides a schematic diagram of experimental spacer 2.
Figure 14:
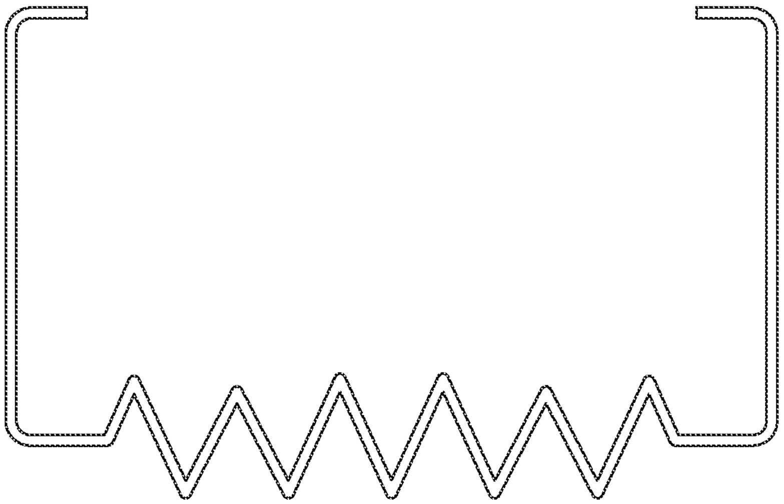
FIG. 14 provides a schematic diagram of experimental spacer 4.
Figure 15:
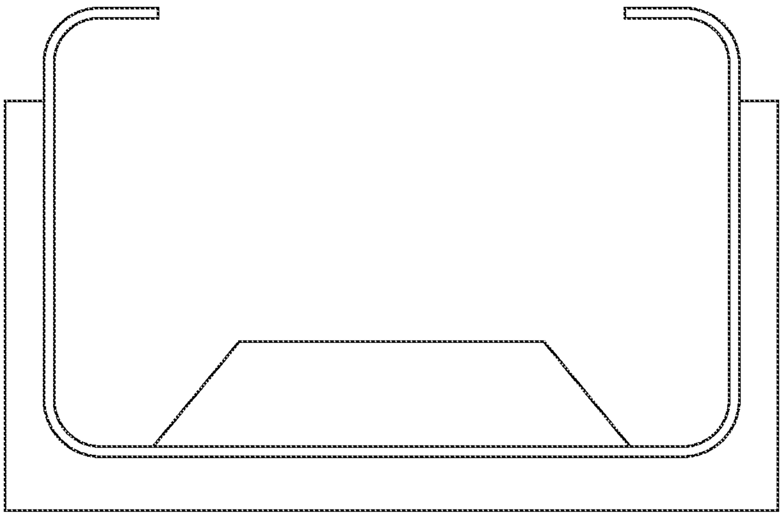
FIG. 15 depicts the comparative INTERCEPT ULTRA Stainless Steel spacer.
Figure 16:
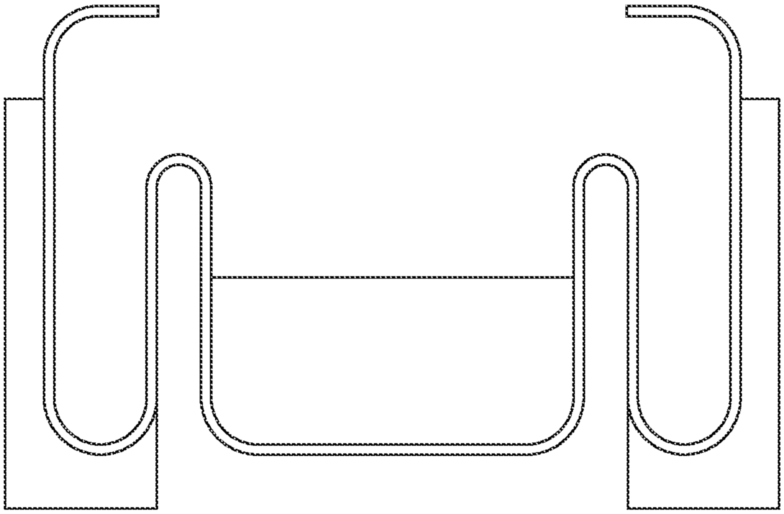
FIG. 16 provides a schematic diagram of experimental spacer 3.

FIG. 3A depicts spacer 224 having the profile of experimental spacer 1. FIG. 13 provides a schematic diagrams of experimental spacer 2. FIG. 3B depicts spacer 324 having the profile of experimental spacer 3 (see also FIG. 16). FIG. 14 provides a schematic diagrams of experimental spacer 4. FIG. 15 depicts the comparative INTERCEPT ULTRA Stainless Steel spacer. Res-values for those spacers are depicted in Table 2.

TABLE 2

| Spacer Technology | Res - value [(in-hr-° F.)/BTU] |
|---|---|
| Intercept ULTRA Stainless Steel | 105 |
| Experimental Spacer 4 | 127 |
| Experimental Spacer 2 | 138 |
| Experimental spacer 3 | 187 |
| Experimental Spacer 1 | 216 |

Example 5—Exemplary Spacers

FIG. 17 provides a table providing exemplary spacer dimensions for the spacers described herein. In reference to FIG. 12, $W_{sp}$ is the spacer width, $W_{sh}$ refers to the width of the metal strip or coil used to fabricate the spacer. Single seal refers to use of a single adhesive, and dual seal refers to use of two adhesives, for example as shown in FIGS. 3A and 3B, respectively. Frame configuration is in reference to FIGS. 3A (configuration A) and 3B (configuration B). For all examples, the size and shape of the central region, between the lateral walls, is held constant.

In another example, for spacers having a width of 15⁄32", the width of the metal in the central folded region, excluding lateral walls and lips, is 1.019" for a single-seal spacer, and 0.897" for a dual-seal spacer.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An insulating glazing unit comprising:

a first panel and a second panel, the first panel having a No. 1 surface and an opposite No. 2 surface and marginal edges, the second panel having a No. 3 surface and an opposite No. 4 surface and marginal edges;

a metal spacer formed from a single metal sheet, having an internal side and an opposite external side, affixed with adhesive to marginal portions of the No. 2 surface of the first panel and the No. 3 surface of the second panel and supporting the first and second panel in a spaced-apart configuration forming a chamber, with the internal side of the metal spacer, the No. 2 surface of the first panel, and the No. 3 surface of the second panel defining a sealed compartment, the metal spacer comprising:

a first wall on a first lateral side of the spacer adjacent to the No. 2 surface of the first panel, having a major planar portion and comprising a first lip extending from an inward side of the first wall toward the No. 3 surface of the second panel;

a second wall on a second lateral side of the spacer opposite the first wall and adjacent to the No. 3 surface of the second panel, having a major planar portion and comprising a second lip extending from an inward side of the second wall toward the No. 2 surface of the first panel, wherein the first and second lips define a gap opening into the compartment, wherein the gap opening is in fluid communication with the chamber formed by the first and second panel, and a central portion extending from a marginal side of the first wall opposite the first lip to a marginal side of the second wall opposite the second lip, comprising two or more longitudinal ridges with a first lateral valley portion between and connecting the first wall and an adjacent ridge and defining a first lateral valley on the internal side of the spacer, a second lateral valley portion between and connecting the second wall and an adjacent ridge and defining a second lateral valley on the internal side of the spacer, and one or more central valley portions between and connecting longitudinal ridges and defining one or more central valleys on the internal side of the spacer, each ridge comprising a plurality of walls comprising parallel portions parallel to each other, with peak portions connecting adjacent walls; and desiccant disposed in a central valley, wherein the insulating glazing unit has a Res-value of at least 175 (in-hr-° F.)/BTU.

2. The insulating glazing unit of claim 1, wherein the first and second lateral valleys are free of desiccant.

3. The insulating glazing unit of claim 1, wherein the first wall is substantially parallel to the first panel and the second wall is parallel to or substantially parallel to the first panel.

4. The insulating glazing unit of claim 1, wherein the height of the ridges ranges from 50% to 80% of the height of the spacer.

5. The insulating glazing unit of claim 1, wherein the planar portions of the walls of the ridges are parallel to the planar portion of the first wall, the second wall, or both the first and second walls.

6. The insulating glazing unit of claim 1, wherein one or more of the peak portions and/or one or more of the valley portions comprises a flat portion perpendicular to, or substantially perpendicular to the walls of the ridges.

7. The insulating glazing unit of claim 1, further comprising a lateral fold extending from the first wall to the first lateral valley and/or from the second wall to the second lateral valley at an angle of less than 90° from a plane of the planar portion of the first and/or second wall.

8. The insulating glazing unit of claim 1, wherein the adhesive between the No. 2 surface of the first panel and the first wall adjacent to the first panel covers at least a portion of the external side of the first lateral valley portion, and the adhesive between the No. 3 surface of the second panel and the second wall adjacent to the second panel covers at least a portion of the external side of the second lateral valley portion, and wherein a remainder of the external side of the spacer is in contact with a gas or an insulating material.

9. The insulating glazing unit of claim 1, wherein the width of the spacer is no more than 35% the linear width of the metal folded to form the spacer.

10. The insulating glazing unit of claim 1, wherein the spacer comprises three longitudinal ridges.

11. The insulating glazing unit of claim 1, wherein the spacer forms a contiguous frame surrounding, and forming an airtight seal about the compartment.

12. The insulating glazing unit of claim 1, wherein the adhesive comprises a polyisobutylene portion and a silicone portion.

13. The insulating glazing unit of claim 1, wherein the insulating glazing unit has a Res-value of at least 187 (in-hr-° F.)/BTU.

14. A method of preparing an insulating glazing unit, comprising affixing a spacer between a first glazing panel and a second glazing panel, the spacer comprising:

a single metal sheet formed into a structure comprising:

an elongate corrugated portion comprising two or more longitudinal ridges;

a first elongate lateral wall, having a major planar portion and extending from a first major edge of the corrugated portion;

a second lateral elongate wall, having a major planar portion and extending from a second major edge of the corrugated portion in the same direction as the first elongate wall;

a first lip extending from the first elongate lateral wall opposite the corrugated portion and extending towards the second elongate lateral wall; and a second lip extending from the second elongate lateral wall opposite the corrugated portion and extending towards the first elongate lateral wall, wherein a combined length of the first lip and the second lip is less than a length of the elongate corrugated portion so as to define a gap between the first lip and the second lip, and wherein the first lip and the second lip define a maximum height of the spacer;

the corrugated portion comprising two or more longitudinal ridges, with a first lateral valley portion between and connecting the first elongate lateral wall and an adjacent ridge and defining a first lateral valley, a second lateral valley portion between and connecting the second elongate lateral wall and an adjacent ridge and defining a second lateral valley, and one or more central valley portions between and connecting adjacent longitudinal ridges and defining one or more central valleys, each ridge comprising a plurality of walls, with peak portions connecting adjacent walls, the method further comprising affixing the spacer with an adhesive to marginal portions of a major surface of the first panel and the second panel, and holding the first and second panels in a spaced-apart configuration, thereby defining a compartment, wherein the insulating glazing unit has a Res-value of at least 175 (in-hr-° F.)/BTU.

15. The method of claim 14, further comprising nicking at least the first and second lips of the spacer and optionally a portion of the first and second wall adjacent to the lips, at a bending location on the spacer, and bending the spacer towards the nicks at the bending location.

16. The method of claim 14, comprising, in order, applying adhesive to the spacer, bending the spacer to align with marginal portions of the panels, and affixing the spacer between the first glazing panel and the second glazing panel.

17. The method of claim 14, wherein the one or more of the central valleys is configured to receive desiccant, and wherein the first and second lateral valleys are configured to be free of desiccant.

18. The method of claim 14, wherein the spacer is configured such that a major planar portion of the first elongate lateral wall is parallel to a major planar portion of the second elongate lateral wall.

19. The spacer of claim 14, wherein the spacer is configured such that the plurality of walls of the ridges are substantially parallel to the first elongate lateral wall and/or the second elongate lateral wall.

20. The spacer of claim 14, wherein the spacer is configured such that one or more of the peaks and/or one or more of the valleys comprises a flat portion substantially perpendicular to the walls of the ridges.

* * * * *